(12) United States Patent
Dwyer et al.

(10) Patent No.: US 12,210,034 B2
(45) Date of Patent: Jan. 28, 2025

(54) ACCELEROMETER INCLUDING PROTECTIVE HOUSING

(71) Applicant: Honeywell International Inc., Charlotte, NC (US)

(72) Inventors: Paul W. Dwyer, Seattle, WA (US); Robert J. Meyer, Kirkland, WA (US)

(73) Assignee: Honeywell International Inc., Charlotte, NC (US)

(*) Notice: Subject to any disclaimer, the term of this patent is extended or adjusted under 35 U.S.C. 154(b) by 14 days.

(21) Appl. No.: 17/938,203

(22) Filed: Oct. 5, 2022

(65) Prior Publication Data
US 2024/0118306 A1    Apr. 11, 2024

(51) Int. Cl.
*G01P 15/13*   (2006.01)
*G01P 1/02*    (2006.01)
*G01P 15/125*  (2006.01)

(52) U.S. Cl.
CPC .......... *G01P 15/125* (2013.01); *G01P 15/131* (2013.01); *G01P 1/023* (2013.01)

(58) Field of Classification Search
CPC .................................................. G01P 15/132
See application file for complete search history.

(56) References Cited

U.S. PATENT DOCUMENTS

| | | | |
|---|---|---|---|
| 2,884,608 A | 4/1959 | Jessen | |
| 2,888,256 A * | 5/1959 | Sedgfield | G01P 15/132 73/514.24 |
| 3,126,518 A | 3/1964 | Johannson | |
| 3,680,393 A * | 8/1972 | Rogall | G01P 15/132 73/514.23 |

(Continued)

FOREIGN PATENT DOCUMENTS

| | | |
|---|---|---|
| CN | 102998481 A | 3/2013 |
| CN | 215005460 U | 12/2021 |

(Continued)

OTHER PUBLICATIONS

Title: Magnetic Field Produced by a Coil; Url: https://www.nde-ed.org/Physics/Magnetism/CoilField.xhtml#:~:text=A%20long%2C%20straight%20coil%20of,the%20magnetic%20particle%20testing%20method. (Year: 2024).*

(Continued)

*Primary Examiner* — Jill E Culler
*Assistant Examiner* — Ruben C Parco, Jr.
(74) *Attorney, Agent, or Firm* — Shumaker & Sieffert, P.A.

(57) ABSTRACT

In some examples, an accelerometer system includes a first excitation ring comprising: a first housing; and a first cover removably attached to the first housing, wherein the first housing and the first cover define a first recess. The accelerometer system also includes a second excitation ring comprising: a second housing; and a second cover removably attached to the second housing, wherein the second housing and the second cover define a second recess. The accelerometer system also includes a proof mass assembly; and processing circuitry located within one or both of the first recess and the second recess, wherein the first excitation ring and the second excitation ring shield the processing circuitry from harmful levels of radiation existing outside of the accelerometer system, and wherein the processing circuitry is configured to maintain a proof mass of the proof mass assembly in a null position.

20 Claims, 9 Drawing Sheets

(56) References Cited

U.S. PATENT DOCUMENTS

| | | | |
|---|---|---|---|
| 4,414,848 A | | 11/1983 | Shutt |
| 4,517,841 A | | 5/1985 | Peters et al. |
| 4,872,342 A | | 10/1989 | Hanson et al. |
| 4,941,354 A | | 7/1990 | Russell et al. |
| 5,024,089 A | * | 6/1991 | Norling ................ G01P 1/006 |
| | | | 73/497 |
| 5,152,171 A | * | 10/1992 | Riggs ................ G01P 15/132 |
| | | | 73/514.39 |
| 5,203,199 A | | 4/1993 | Henderson et al. |
| 5,203,210 A | * | 4/1993 | Terry ................ G01P 15/132 |
| | | | 73/514.17 |
| 5,265,471 A | | 11/1993 | Kawauchi et al. |
| 5,265,474 A | | 11/1993 | Chaffin et al. |
| 7,100,447 B2 | | 9/2006 | Dwyer |
| 7,280,078 B2 | | 10/2007 | Salsman et al. |
| 7,323,766 B2 | | 1/2008 | Weiblen et al. |
| 7,926,348 B2 | | 4/2011 | Dwyer |
| 8,065,915 B2 | | 11/2011 | Paul et al. |
| 8,220,330 B2 | | 7/2012 | Miller et al. |
| 8,459,113 B2 | | 6/2013 | Kuramoto et al. |
| 8,664,951 B2 | | 3/2014 | Johnson et al. |
| 9,164,122 B2 | | 10/2015 | Walling et al. |
| 9,650,237 B2 | | 5/2017 | Ocak et al. |
| RE46,671 E | | 1/2018 | Combi et al. |
| 11,275,098 B2 | | 3/2022 | Dwyer |
| 2007/0039388 A1 | * | 2/2007 | Dwyer ................ G01P 15/132 |
| | | | 73/514.31 |
| 2007/0204693 A1 | | 9/2007 | Chernyak et al. |
| 2008/0282802 A1 | | 11/2008 | Pike et al. |
| 2009/0322260 A1 | | 12/2009 | Lee |
| 2010/0180681 A1 | | 7/2010 | Dwyer |
| 2010/0269590 A1 | | 10/2010 | Guenther et al. |
| 2011/0209545 A1 | * | 9/2011 | Kuramoto ............ G01P 15/125 |
| | | | 73/514.21 |
| 2013/0336095 A1 | | 12/2013 | Seppa et al. |
| 2017/0103839 A1 | * | 4/2017 | Choi ................ H01F 7/1646 |
| 2017/0122976 A1 | | 5/2017 | Mitchell et al. |
| 2017/0356927 A1 | | 12/2017 | Dwyer et al. |
| 2021/0246557 A1 | * | 8/2021 | Dwyer ................ G01P 15/132 |

FOREIGN PATENT DOCUMENTS

| | | |
|---|---|---|
| EP | 0323709 B1 * | 6/1992 |
| WO | 1986003300 | 6/1986 |
| WO | 9119987 A1 | 12/1991 |

OTHER PUBLICATIONS

"Invar Alloy 36", Boltport Inc., Retrieved from: https://www.boltport.com/materials/invar-alloys/36/, Accessed on: Aug. 11, 2022, 8 pp.

"Invar-36 Fasteners Specification", TorqBolt Inc., Retrieved from: https://hex-bolt.com/invar-36-fasteners/, Oct. 4, 2015, 2 pp.

"SiO2: Properties and Applications The Universal Compound", Enigmatics, Retrieved from: http://www.enigmatic-consulting.com/semiconductor_processing/CVD_Fundamentals/films/SiO2_properties.html, Accessed on: Aug. 11, 2022, 7 pp.

Knudson et al., "The Effects of Radiation on MEMS Accelerometers", IEEE, Jan. 1997, 5 pp.

Extended Search Report from counterpart European Application No. 23197181.3 dated Feb. 5, 2024, 8 pp.

Response to Extended Search Report dated Feb. 5, 2024, from counterpart European Application No. 23197181.3 filed Feb. 22, 2024, 62 pp.

Notice of Intent to Grant and Text Intended to Grant from counterpart European Application No. 23197181.3 dated Jun. 17, 2024, 8 pp.

* cited by examiner

ACCELEROMETER INCLUDING PROTECTIVE HOUSING

TECHNICAL FIELD

This disclosure relates to accelerometers.

BACKGROUND

Accelerometers function by detecting a displacement of a proof mass under inertial forces. Some accelerometers include a capacitive pick-off system. For example, electrically conductive material (e.g., a capacitor plate) may be deposited on the upper surface of the proof mass, and similar electrically conductive material may be deposited on the lower surface of the proof mass. An acceleration or force applied along the sensitive axis of the accelerometer causes the proof mass to deflect either upwardly or downwardly causing the distance (e.g., a capacitive gap) between the pick-off capacitance plates and upper and lower non-moving members to vary. This variance in the capacitive gap causes a change in the capacitance of the capacitive elements, which is representative of the displacement of the proof mass along the sensitive axis. The change in the capacitance may be used as a displacement signal, which may be applied to a servo system that includes one or more electromagnets (e.g., a force-rebalancing coil) to return the proof mass to a null or at-rest position.

SUMMARY

In general, the disclosure is directed to devices, systems, and techniques for determining an acceleration of one or more devices. Accelerometer systems that use electromagnetic forces to counteract proof mass displacement may be affected by one or more electromagnetic phenomena. For example, hysteresis may be present when a change in one electromagnetic parameter lags behind a change in another magnetic parameter such that a behavior of the system depends on the history of the system. One example of hysteresis is when a change in magnetic flux lags behind a change in magnetic force. This means that magnetic flux does not immediately disappear from a material when magnetic force is removed from the material. Inherent properties of materials of an accelerometer system and/or relative properties between the materials may affect hysteresis within the accelerometer system. Techniques described herein may include using a magnetic circuit assembly that mitigates an effect of hysteresis on the accelerometer system.

A magnetic circuit assembly of an accelerometer system may include one or more pieces of metal alloy material. Boundaries between pieces of metal alloy material may increase an effect of hysteresis on the system, because adhesive materials that connect pieces of metal alloy material may have a different coefficient of thermal expansion (CTE) than the metal alloy. This means that when the accelerometer device is exposed to high temperatures, the adhesive material may expand at different rates than the metal alloy, increasing the effect of hysteresis. Additionally, or alternatively, a magnet being present along the flux path in the magnetic circuit assembly may increase an effect of hysteresis as compared with accelerometer systems where a magnetic circuit assembly does not include a magnet. Decreasing a number of boundaries between dissimilar materials in the magnetic circuit assembly and removing a magnet from the magnetic circuit assembly may improve a performance of the accelerometer system as compared with systems that include a magnet in a magnetic circuit assembly and include a greater number of boundaries between materials.

The accelerometer system may include electronic circuitry that is configured to control an amount of current delivered to a coil attached to a proof mass. The electronic circuitry may deliver an amount of current to the coil that is required to maintain the proof mass in a null position. The amount of current delivered to the coil may be correlated with an acceleration of the system. In some cases, it may be beneficial to protect the electronic circuitry from environments that are harmful to the electronic circuitry. Environments that are potentially harmful to electronic circuitry may include high levels of gamma radiation, cosmic rays, or high-energy particles. A magnetic circuit assembly may include an excitation ring that forms a recess and is configured to be assembled from multiple pieces, such that the electronic circuitry may be placed within the recess. The excitation ring may be made of materials that protect the electronic circuitry from harmful environments, and may be assembled and secured using fasteners of similar materials that reduce an effect of hysteresis, such as described above.

In some examples, an accelerometer system includes a first excitation ring comprising: a first housing; and a first cover removably attached to the first housing, wherein the first housing and the first cover define a first recess. The accelerometer system also includes a second excitation ring comprising: a second housing; and a second cover removably attached to the second housing, wherein the second housing and the second cover define a second recess. The accelerometer system also includes a proof mass assembly positioned between the first excitation ring and the second excitation ring; and processing circuitry located within one or both of the first recess and the second recess, wherein the first excitation ring and the second excitation ring shield the processing circuitry from harmful levels of radiation existing outside of the accelerometer system, and wherein the processing circuitry is configured to maintain a proof mass of the proof mass assembly in a null position.

In some examples, an accelerometer system includes an excitation ring comprising: a housing; and a cover removably attached to the housing, wherein the housing and the cover define a recess. The accelerometer system also includes a proof mass assembly positioned on one side of the excitation ring; and processing circuitry located within the recess, wherein the excitation ring shields the processing circuitry from harmful levels of radiation existing outside of the accelerometer system, wherein the processing circuitry is configured to maintain a proof mass of the proof mass assembly in a null position.

In some examples, a method includes forming an excitation ring, wherein forming the excitation ring comprises: forming a housing; and forming a cover removably attached to the housing, wherein the housing and the cover define a recess. The method also includes forming a proof mass assembly positioned on one side of the excitation ring; and forming processing circuitry located within the recess, wherein the excitation ring shields the processing circuitry from harmful levels of radiation existing outside of the accelerometer system, wherein the processing circuitry is configured to maintain a proof mass of the proof mass assembly in a null position.

In some examples, an accelerometer system includes a first electromagnetic coil; and a first excitation ring comprising: a first housing; and a first cover removably attached to the first housing, wherein the first housing and the first cover define a first recess configured to house the first electromagnetic coil. The accelerometer system also includes a second electromagnetic coil; and a second excitation ring comprising: a second housing; and a second cover removably attached to the second housing, wherein the second housing and the second cover define a second recess configured to house the second electromagnetic coil. The accelerometer system also includes a proof mass assembly positioned between the first excitation ring and the second excitation ring, wherein the first electromagnetic coil is configured to generate a first magnetic flux that flows through the first excitation ring and maintains a proof mass of the proof mass assembly in a null position, and wherein the second electromagnetic coil is configured to generate a second magnetic flux that flows through the second excitation ring and maintains the proof mass in the null position.

In some examples, an accelerometer system includes an electromagnetic coil; and an excitation ring comprising: a housing; and a cover removably attached to the housing, wherein the housing and the cover define a recess configured to house the electromagnetic coil. The accelerometer system also includes a proof mass assembly positioned on one side of the excitation ring, wherein the electromagnetic coil is configured to generate a magnetic flux that flows through the excitation ring and maintains a proof mass of the proof mass assembly in a null position.

In some examples, a method includes forming an electromagnetic coil; and forming an excitation ring, wherein forming the excitation ring comprises: forming a housing; and forming a cover removably attached to the housing, wherein the housing and the cover define a recess configured to house the electromagnetic coil. The method also includes forming a proof mass assembly positioned on one side of the excitation ring, wherein the electromagnetic coil is configured to generate a magnetic flux that flows through the excitation ring and maintains a proof mass of the proof mass assembly in a null position.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
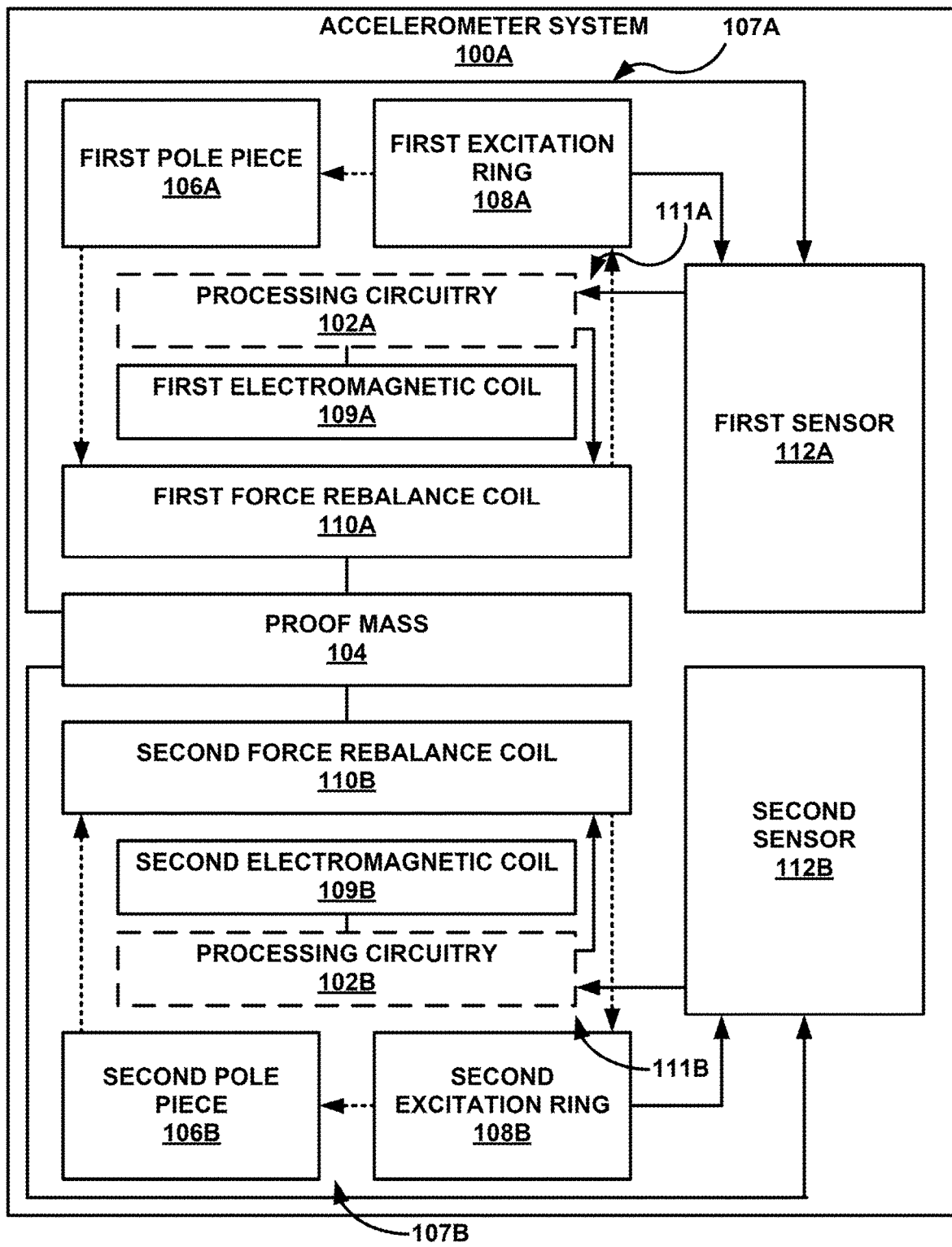
FIG. 1 is a block diagram illustrating an accelerometer system, in accordance with one or more techniques of this disclosure.

FIG. 1 is a block diagram illustrating an accelerometer system 100A, in accordance with one or more techniques of this disclosure. As illustrated in FIG. 1, accelerometer system 100 includes processing circuitry 102A and processing circuitry 102B (collectively, "processing circuitry 102"), proof mass 104, first pole piece 106A, second pole piece 106B (collectively, "pole pieces 106"), first electromagnetic coil 109A, second electromagnetic coil 109B (collectively, "electromagnetic coils 109"), first excitation ring 108A, second excitation ring 108B (collectively, "excitation rings 108"), first force rebalance coil 110A, second force rebalance coil 110B (collectively, "force rebalance coils 110"), first sensor 112A, second sensor 112B (collectively, "sensors 112"), first magnetic circuit assembly 107A that includes first pole piece 106A and first excitation ring 108A, and second magnetic circuit assembly 107B that includes second pole piece 106B and second excitation ring 108B (collectively, "magnetic circuit assemblies 107").

Accelerometer system 100 is configured to determine an acceleration associated with an object (not illustrated in FIG. 1) coupled to the accelerometer system based on a magnitude of one or more electrical signals delivered to force rebalance coils 110, the electrical signals countering displacement of proof mass 104 from a null position. For example, first sensor 112A may be configured to generate a first sense signal which indicates a size of a gap between proof mass 104 and first excitation ring 108A and second sensor 112B may be configured to generate a second sense signal which indicates a size of a gap between proof mass 104 and second excitation ring 108B. Processing circuitry 102A may generate a first electrical signal for delivery to first force rebalance coil 110A based on the first sense signal and processing circuitry 102B may generate a second electrical signal for delivery to second force rebalance coil 110B based on the second sense signal. The first electrical signal and the second electrical signal may induce one or more Lorentz forces which prevent the displacement of proof mass 104 from a null position.

A Lorentz force represents a force caused by an interaction of an electric fields and a magnetic field. For example, a Lorentz force may be defined by a cross product of an electrical field and a magnetic field, where the direction of the Lorentz force depends on the direction of the electrical field and the direction of the magnetic field, and where the magnitude of the Lorentz force depends on the magnitude of the electrical field and the magnitude of the magnetic field. When the object is accelerating, it may be necessary to deliver a Lorentz force equal and opposite to the acceleration in order to maintain the proof mass 104 in the null position. Consequently, based on the magnitude of the magnetic field and the electrical field that cause the Lorentz force which maintains the proof mass 104 in the null position, the system may determine the acceleration.

Processing circuitry 102A and processing circuitry 102B may include one or more processors that are configured to implement functionality and/or process instructions for execution within accelerometer system 100. For example, processing circuitry 102A and processing circuitry 102B may be capable of processing instructions stored in a memory. Processing circuitry 102A and processing circuitry 102B may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 102A and processing circuitry 102B may include any suitable structure, whether in hardware, software, firmware, or any combination thereof, to perform the functions ascribed herein to processing circuitry 102A and processing circuitry 102B.

A memory (not illustrated in FIG. 1) may be configured to store information within accelerometer system 100 during operation. The memory may include a computer-readable storage medium or computer-readable storage device. In some examples, the memory includes one or more of a short-term memory or a long-term memory. The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, the memory is used to store program instructions for execution by processing circuitry 102.

Processing circuitry 102A and processing circuitry 102B may generate the first electrical signal and the second electrical signal as a part of a one or more negative feedback loops which maintain proof mass 104 in the null position. Each negative feedback loop may include one or more magnetic circuits and one or more electrical circuits. As used herein, the term "magnetic circuit" refers to one or more magnetic circuit elements that are configured to carry magnetic flux through a magnetic flux loop. As used herein, the term "electrical circuit" may refer to one or more electrical circuit elements that are configured to carry electrical current through an electrical current loop.

Processing circuitry 102A, first electromagnetic coil 109A, first force rebalance coil 110A, and first sensor 112A may represent components of a first negative feedback loop. The first negative feedback loop may maintain a width of the gap between proof mass 104 and first excitation ring 108A at a first null width. For example, first sensor 112A may generate the first sense signal which indicates a capacitance value. The capacitance value is correlated with the width of the gap between proof mass 104 and first excitation ring 108A and delivers the first sense signal to processing circuitry 102A. Processing circuitry 102A may generate the first electrical signal based on the first sense signal and deliver the first electrical signal to first force rebalance coil 110A in order to maintain the capacitance value of the first sense signal at a first null capacitance value. By generating the first electrical signal in order to maintain the capacitance value of the first sense signal at the first null capacitance value, processing circuitry 102A maintains a width of the gap between the proof mass 104 and the first excitation ring 108A at the first null width.

In some examples, to maintain the width of the gap between the proof mass 104 and the first excitation ring 108A at the first null width, processing circuitry 102A may both output the first electrical signal to first force rebalance coil 110A which represents a first electrical circuit and control first electromagnetic coil 109A to induce a magnetic field through a first magnetic circuit. First force rebalance coil 110A may form the first electrical circuit that carries an electrical current through first force rebalance coil 110A. The first magnetic circuit may include first pole piece 106A, first excitation ring 108A, and first force rebalance coil 110A. Magnetic flux may travel across first force rebalance coil 110A to the first excitation ring 108A, travel through the first excitation ring 108A to the first pole piece 106A, and travel through the first pole piece 106A back to the first force rebalance coil 110A in order to complete the first magnetic circuit. In some cases, although first electromagnetic coil 109A generates the magnetic flux that travels through the first magnetic circuit, the first electromagnetic coil 109A is not part of the first magnetic circuit which carries the magnetic flux.

Processing circuitry 102B, second electromagnetic coil 109B, second force rebalance coil 110B, and second sensor 112B represent components of a second negative feedback loop. The second negative feedback loop may maintain a width of the gap between proof mass 104 and second excitation ring 108B at a second null width. For example, second sensor 112B may generate the second sense signal which indicates a second capacitance value. The capacitance value is correlated with the width of the gap between proof mass 104 and second excitation ring 108B and delivers the second sense signal to processing circuitry 102B. Processing circuitry 102B may generate the second electrical signal based on the second sense signal and deliver the second electrical signal to second force rebalance coil 110B in order to maintain the capacitance value of the second sense signal at a second null capacitance value. By generating the second electrical signal in order to maintain the second capacitance value of the second sense signal at the second null capacitance value, processing circuitry 102B maintains a width of the gap between the proof mass 104 and the second excitation ring 108B at the second null width.

In some examples, to maintain the width of the gap between the proof mass 104 and the second excitation ring 108B at the second null width, processing circuitry 102B may both output the second electrical signal to second force rebalance coil 110B which represents a second electrical circuit and control second electromagnetic coil 109B to induce a magnetic field through a second magnetic circuit. Second force rebalance coil 110B may form the second electrical circuit that carries an electrical current through second force rebalance coil 110B. The second magnetic circuit may include second pole piece 106B, second excitation ring 108B, and second force rebalance coil 110B. Magnetic flux may travel across second force rebalance coil 110B to the second excitation ring 108B, travel through the second excitation ring 108B to the second pole piece 106B, and travel through the second pole piece 106B back to the second force rebalance coil 110B in order to complete the second magnetic circuit. In some cases, although second electromagnetic coil 109B generates the magnetic flux that travels through the second magnetic circuit, the second electromagnetic coil 109B is not part of the second magnetic circuit which carries the magnetic flux.

By maintaining the width of the gap between the proof mass 104 and the first excitation ring 108A at the first null width and maintaining the width of the gap between the proof mass 104 and the second excitation ring 108B at the second null width, processing circuitry 102A and processing circuitry 102B may maintain a position of proof mass 104 at a null position relative to excitation rings 108.

When an acceleration of accelerometer system 100 along a sense axis changes, the resulting acceleration force applied to proof mass 104 may change. Consequently, processing circuitry 102A may change a magnitude of the first electrical signal delivered to first force rebalance coil 110A, and processing circuitry 102B may change a magnitude of the second electrical signal delivered to second force rebalance coil 110B in order to prevent a displacement of proof mass 104 relative to excitation rings 108. In one example, the acceleration along the sense axis may increase from a first acceleration value to a second acceleration value. Processing circuitry 102A may change the magnitude of the first electrical signal and processing circuitry 102B may change the magnitude of the second electrical signal in order to account for the change in acceleration so that proof mass 104 remains in the null position relative to excitation rings 108. Processing circuitry 102A and/or processing circuitry 102B may determine the acceleration of accelerometer system 100 along the sense axis based on the magnitude of the first electrical signal delivered to first force rebalance coil 110A and the magnitude of the second electrical signal delivered to second force rebalance coil 110B. Additionally, or alternatively, processing circuitry 102A and/or processing circuitry 102B may determine the acceleration of accelerometer system 100 along the sense axis based on a magnitude of the magnetic flux across the first force rebalance coil 110A and a magnitude of the magnetic flux across the second force rebalance coil 110B.

In some examples, the magnitude of the first electrical signal delivered to first force rebalance coil 110A is proportional to the acceleration along the sense axis. In some examples, the magnitude of the second electrical signal delivered to second force rebalance coil 110B is proportional to the acceleration along the sense axis. As such, an increase in the magnitude of the first electrical signal may correspond to an increase in the acceleration along the sense axis and an increase in the magnitude of the second electrical signal may correspond to an increase in the acceleration along the sense axis. Alternatively, a decrease in the magnitude of the first electrical signal may correspond to a decrease in the acceleration along the sense axis and a decrease in the magnitude of the second electrical signal may correspond to a decrease in the acceleration along the sense axis.

Accelerometer system 100 may represent a servo system which counter-balances acceleration along the sense axis with Lorentz forces parallel to the sense axis. For example, if accelerometer system 100 accelerates along the sense axis, the acceleration may apply an acceleration force to the proof mass 104, where the acceleration force is applied to proof mass 104 in an opposite direction of the acceleration of accelerometer system 100. This means that applying a Lorentz force to proof mass 104 along the sense axis that is equal and opposite to the acceleration force along the sense axis causes the proof mass 104 to remain in the null position. The Lorentz force may be applied in the same direction as the acceleration since the acceleration force is applied to proof mass 104 in the opposite direction of the acceleration.

Processing circuitry 102A may deliver the first electrical signal to first force rebalance coil 110A, and processing circuitry 102B may deliver the second electrical signal to second force rebalance coil 110B in order to generate one or more Lorentz forces which counter-balance the acceleration force resulting from the acceleration along the sense axis. That is, the one or more Lorentz forces are applied to proof mass 104 in an opposite direction to the acceleration force, such that proof mass 104 is not displaced from a null position by the acceleration force. The magnitude of the acceleration force changes based on the magnitude of the acceleration along the sense axis. As such, to prevent the displacement of proof mass 104 from the null position, processing circuitry 102A changes the magnitude of the first electrical signal delivered to first force rebalance coil 110A and processing circuitry 102B changes the magnitude of the second electrical signal delivered to second force rebalance coil 110B in order to change the magnitude of the one or more Lorentz forces which counter-balance the acceleration signal.

As discussed above, accelerometer system 100 includes a first magnetic circuit which carries a first magnetic flux and a second magnetic circuit which carries a second magnetic flux. The first magnetic circuit passes a first magnetic flux from the pole piece 106A to first excitation ring 108A through first force rebalance coil 110A, and the first excitation ring 108A carries the first magnetic flux back to the first pole piece 106A to complete the first magnetic circuit. The first electrical signal may represent an electrical current which flows through first force rebalance coil 110A to complete a first electrical circuit. The first magnetic flux and the first electrical signal may cause a first Lorentz force to be applied to proof mass 104 in an opposite direction of the acceleration force applied to proof mass 104 due to the acceleration along the sense axis. In some examples, the first Lorentz force is a cross product of the magnitude of the first magnetic flux and the first electrical signal at the first force rebalance coil 110A.

The second magnetic circuit passes a second magnetic flux from the second pole piece 106B to second excitation ring 108B through second force rebalance coil 110B, and the second excitation ring 108B carries the second magnetic flux back to the second pole piece 106B to complete the second magnetic circuit. The second electrical signal may represent an electrical current which flows through second force rebalance coil 110B to complete a second electrical circuit. The second magnetic flux and the second electrical signal may cause a second Lorentz force to be applied to proof mass 104 in an opposite direction of the acceleration force applied to proof mass 104 due to the acceleration along the sense axis. In some examples, the second Lorentz force is a cross product of the magnitude of the second magnetic flux and the second electrical signal at the second force rebalance coil 110B.

In some examples, pole pieces 106 may be round in shape, and force rebalance coils 110 may be round in shape such that respective openings of force rebalance coils 110 are configured to receive pole pieces 106. For example, first force rebalance coil 110A may include a first round opening which receives first pole piece 106A which includes a round-shaped cross-section. Second force rebalance coil 110B may include a second round opening which receives second pole piece 106B which includes a round-shaped cross-section. As discussed above, accelerometer system 100 includes a first magnetic circuit and a second magnetic circuit. As a part of the first magnetic circuit, a first magnetic flux may flow out the side of first pole piece 106A towards first force rebalance coil 110A. As a part of the second magnetic circuit, a second magnetic flux may flow out the side of second pole piece 106A towards second force rebalance coil 110A.

In some examples, the first pole piece 106A, the first excitation ring 108A, and the first electromagnetic coil 109A may form a first recess 111A. In some examples, the second pole piece 106B, the second excitation ring 108B, and the second electromagnetic coil 109B may form a second recess 111B. In some examples, processing circuitry 102A is located within the first recess 111A. In some examples, first electromagnetic coil 109A is located within the first recess 111A. In some examples, processing circuitry 102B is located within the second recess 111B. In some examples, second electromagnetic coil 109B is located within the second recess 111B.

Accelerometer system 100 may, in some examples, include a housing that encloses one or more components. The housing of accelerometer system 100 may, in some examples, include first excitation ring 108A and second excitation ring 108B. In some examples, the housing of accelerometer system 100 may include one or more other components in addition to first excitation ring 108A and second excitation ring 108B. First recess 111A and second recess 111B may be located on an inside of the housing of accelerometer system 100 such that components placed within first recess 111A and second recess 111B are enclosed by the housing.

The housing of accelerometer system 100, which includes first excitation ring 108A, may protect one or more components located within first recess 111A and second recess 111B from the effects of harmful environments. For example, harmful environments may negatively affect a performance of processing circuitry 102A and processing circuitry 102B. These harmful environments may include potentially damaging levels of gamma radiation, cosmic rays, high-energy particles, or any combination thereof. One example of a harmful environment is outer space, but outer space is not the only example of a harmful environment. Other examples of harmful environments may include Earth's troposphere, stratosphere, mesosphere, and thermosphere. Harmful environments may also include the surface and atmosphere of other planets such as Mercury, Venus, Mars, Jupiter, Saturn, and Neptune.

The housing of accelerometer system 100 may include one or more metal alloy materials that shield components inside of the housing from the effects of harmful environments. For example, first excitation ring 108A and second excitation ring 108B may include a nickel-iron alloy (e.g., invar) that shields processing circuitry 102A and processing circuitry 102B from potentially damaging levels of gamma radiation, cosmic rays, high-energy particles, or any combination thereof. By placing processing circuitry 102A within first recess 111A and placing processing circuitry 102B within second recess 111B, accelerometer system 100 may provide more protection for processing circuitry 102A and processing circuitry 102B as compared with systems that do not place processing circuitry within a protective housing.

As will be further illustrated in FIG. 2 below, to accommodate placement of electromagnets 109 and/or processing circuitry 102 in recesses 111, each respective magnetic circuit assembly 107 may be configured to assemble from multiple pieces. First excitation ring 108A may include a first housing and a first cover. Second excitation ring 108B may include a second housing and a second cover. In some examples, the first housing, the first cover, the second housing, and the second cover may each represent single pieces of metal alloy material. The first cover may be removable from the first housing so that one or more components (e.g., processing circuitry 102A and first electromagnetic coil 109A) may be placed within first recess 111A and secured within first recess 111A by placing the first cover on the first housing. In other words, first excitation ring 108A includes two or more parts configured to disassemble to accommodate placement of processing circuitry 102A. The second cover may be removable from the second housing so that one or more components (e.g., processing circuitry 102B and second electromagnetic coil 109B) may be placed within first recess 111B and secured within second recess 111B by placing the second cover on the second housing. In other words, second excitation ring 108B includes two or more parts configured to disassemble to accommodate placement of processing circuitry 102B.

First pole piece 106A, first excitation ring 108A, and first force rebalance coil 110A may form a first magnetic circuit. First electromagnetic coil 109A, which is placed within first recess 111A, may induce a first magnetic flux through the first magnetic circuit. The first magnetic flux may complete the first magnetic circuit without passing through first electromagnetic coil 109A located within first recess 111A. The first magnetic flux may pass from the first pole piece 106A across the first force rebalance coil 110A to the cover of the first excitation ring 108A. The first magnetic flux may pass through the cover of the first excitation ring 108A to the housing of the first excitation ring 108. The first magnetic flux may pass through the housing of the first excitation ring 108A back to the first pole piece 106A to complete the first magnetic circuit.

Second pole piece 106B, second excitation ring 108B, and second force rebalance coil 110B may form a second magnetic circuit. Second electromagnetic coil 109B, which is placed within second recess 111B, may induce a second magnetic flux through the second magnetic circuit. The second magnetic flux may complete the first magnetic circuit without passing through second electromagnetic coil 109B located within second recess 111B. The second magnetic flux may pass from the second pole piece 106B across the second force rebalance coil 110B to the cover of the second excitation ring 108B. The first magnetic flux may pass through the cover of the second excitation ring 108B to the housing of the second excitation ring 108B. The second magnetic flux may pass through the housing of the second excitation ring 108B back to the second pole piece 106B to complete the first magnetic circuit.

A magnetic circuit that passes magnetic flux through the circuit without the magnetic flux passing through a magnet, an electromagnetic coil, or another source of magnetic flux may mitigate an effect of hysteresis as compared with magnetic circuits that pass magnetic flux through the source of the magnetic flux. The term "hysteresis," as described herein, may refer to the phenomenon in which a change in a magnitude of a magnetic flux flowing through a magnetic circuit lags behind a magnitude of a magnetic force applied to the magnetic circuit. For example, an electromagnetic coil (e.g., first electromagnetic coil 109A and second electromagnetic coil 109B) may induce a magnetic flux through a magnetic circuit by applying a magnetic force to the magnetic circuit. When the electromagnetic coil increases the magnitude of the magnetic force, the magnitude of the magnetic of the magnetic flux may likewise increase, but the increase in the magnitude of the magnetic of the magnetic flux may lag behind the increase in the magnitude of the magnetic force due to hysteresis. Magnetic circuits where the magnetic flux does not flow through the source of the magnetic flux in order to complete the circuit may exhibit a smaller lag between changes in magnetic force and flux as compared with magnetic circuits where the magnetic flux flows through the source of the magnetic flux.

Navigation errors in an accelerometer may be caused by hysteresis in one or more magnetic circuits within the accelerometer. When a magnetic circuit includes a source of magnetic flux (e.g., a magnet) within the magnetic flux pathway of the magnetic circuit, a behavior of the accelerometer may be driven by the inherent hysteresis of the source of magnetic flux. Accelerometer systems that include a source of magnetic flux within the flux pathway may attempt to compensate for errors caused by hysteresis by using a model in order to average an acceleration signal through a hysteresis loop produced by the source of magnetic flux. By placing the sources of magnetic flux (e.g., first electromagnetic coil 109A and second electromagnetic coil 109B) within recesses that are outside of the magnetic flux pathways, accelerometer system 100 may reduce the effect of hysteresis within accelerometer system 100 and thus reduce a frequency and/or magnitude of errors by accelerometer system 100 as compared with systems that include sources of magnetic flux that are within the magnetic flux pathways.

In some examples, using first electromagnetic coil 109A and second electromagnetic coil 109B to generate magnetic flux as opposed to using one or more magnets may reduce the effect of hysteresis within accelerometer system 100. For example, magnets may have an inherent temperature coefficient that contributes to hysteresis. Using magnetic coils instead of magnets may allow the system to model current through the coil as a function of temperature in order to remove the effect of the temperature coefficient.

A magnetic circuit may, in some cases, provide a uniform flux to a coil. The current in the coil may interact with the provided flux to create a force. A flux in the magnetic return path of the magnetic circuit may be modified by a stability of the geometry of an air gap that the coil sits in, a stability of the permeability of the return path material, and a chemical composition of the magnet itself as well as any stresses applied to the magnet. A hysteresis of the return path material may be driven by its chemical composition and the heat treat applied to increase magnetic softness. In some examples, when machining stresses are removed, a magnetic softness is optimized for that material composition. Removing the source of magnetic flux from the flux pathway of the magnetic circuit may contribute to optimizing the magnetic softness.

Bonding components of a magnetic circuit (e.g., magnets, pole pieces, excitation loop components, or any combination thereof) with adhesive materials (e.g., epoxy) may contribute to hysteresis in accelerometer systems. The increase in the effect of hysteresis caused by adhesive materials at material boundaries may also increase a frequency of errors by the accelerometer system. Accelerometer systems having fewer boundaries between materials within magnetic circuits may exhibit a smaller hysteresis effect as compared with accelerometer systems that include a greater number of boundaries between materials.

Magnetic circuits where the magnetic flux does not flow through the source of the magnetic flux may also include fewer boundaries between materials as compared with magnetic circuits where the magnetic flux flows through the source of the magnetic flux. For example, each magnetic circuit assembly 107 may include only a single interface between a respective excitation ring 108 and pole piece, as compared to a magnetic circuit assembly that includes a magnet and corresponding excitation ring and magnet, and pole piece and magnet, interfaces. Additionally or alternatively, magnetic circuit assemblies that include an excitation ring that is modularly assembled may still provide few boundaries between materials. For example, first excitation ring 108A may include a cover portion and a housing portion, with a single boundary between the cover portion and the housing portion. This means that magnetic flux may flow though first excitation ring 108A by crossing only one material boundary. Material boundaries may contribute to hysteresis, because adhesive materials used to hold components together may include a coefficient of thermal expansion that is different than the coefficient of thermal expansion of the materials themselves. Decreasing the number of material boundaries in the magnetic circuit may mitigate the effect of hysteresis.

In some examples, accelerometer system 100A may be exposed to environments having a wide range of temperatures including extreme hot temperatures and extreme low temperatures. In some examples, accelerometer system 100A may be configured to operate in temperatures within a range from 1 degree Kelvin to 553 degrees Kelvin. It may be beneficial for accelerometer system 100 to accurately determine acceleration throughout this wide range of temperatures. Decreasing the effect of hysteresis by placing first electromagnetic coil 109A and second electromagnetic coil 109B outside of the magnetic flux pathways of the magnetic circuits and eliminating adhesive boundaries between materials within the mag magnetic flux pathways may improve an ability of accelerometer system 100A to model the levels of current applied to force rebalance coils 110 based on temperature.

Figure 2:
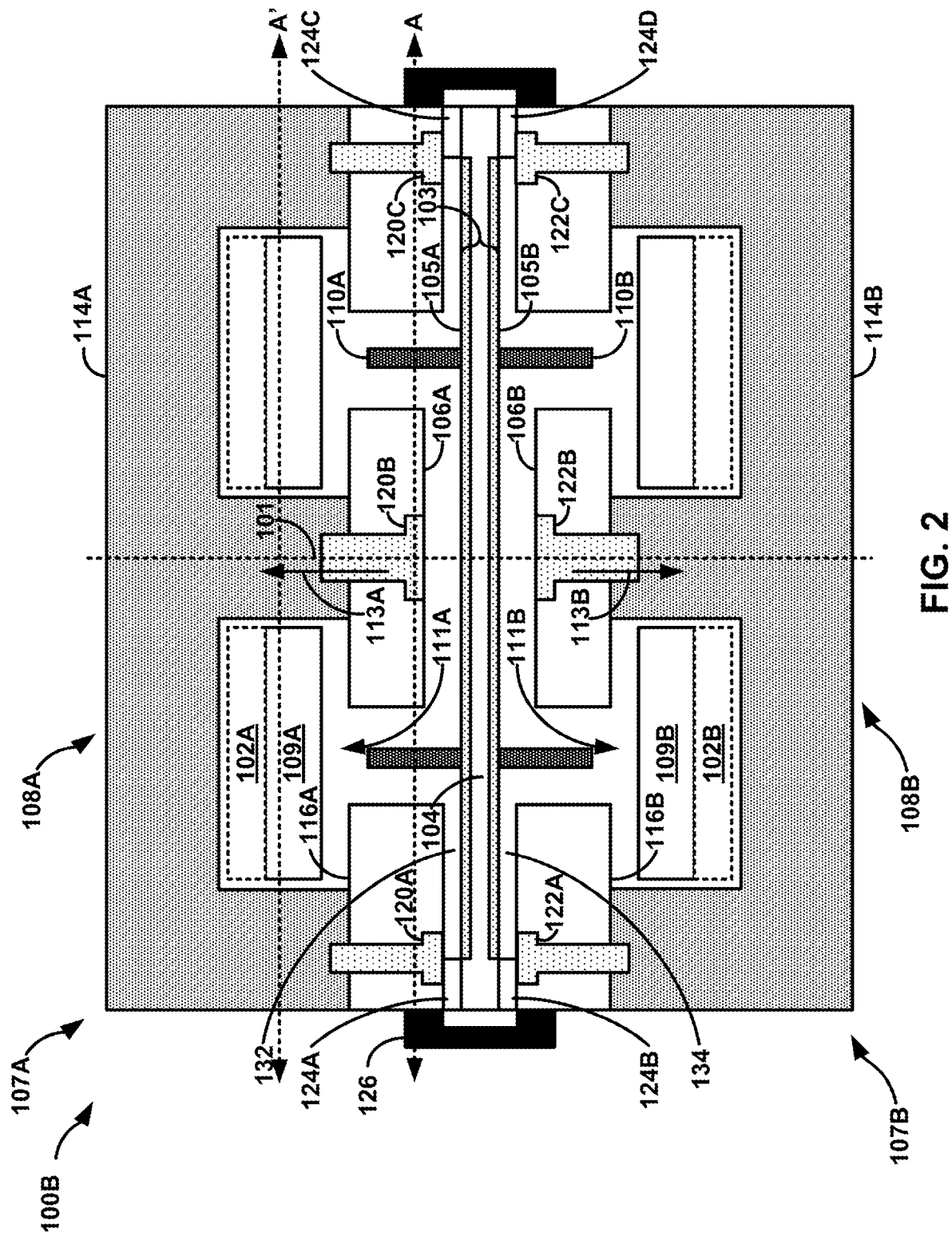
FIG. 2 is a conceptual diagram illustrating a side cutaway view of the accelerometer system of FIG. 1, in accordance with one or more techniques of this disclosure.

FIG. 2 is a conceptual diagram illustrating a side cutaway view 100B of the accelerometer system 100A of FIG. 1, in accordance with one or more techniques of this disclosure. As seen in FIG. 2, the side cutaway view 100B of the accelerometer system 100A includes processing circuitry 102A and 102B (collectively, "processing circuitry 102"), proof mass assembly 103, first pole piece 106A, second pole piece 106B (collectively, "pole pieces 106"), first excitation ring 108A, second excitation ring 108B (collectively, "excitation rings 108"), first electromagnetic coil 109A, second electromagnetic coil 109B (collectively, "electromagnetic coils 109"), first force rebalance coil 110A, and second force rebalance coil 110B (collectively, "force rebalance coils 110"). Proof mass assembly 103 includes proof mass 104, first capacitive plate 105A, and second capacitive plate 105B (collectively, "capacitive plates 105"). In some examples, force rebalance coils 110 may be part of the proof mass assembly 103. First excitation ring 108A may include a first housing 114A and a first cover 116A. Fasteners 120A-120C may attach the first housing 114A to the first cover 116A. Second excitation ring 108B may include a second housing 114B and a second cover 116B. Fasteners 122A-122C may attach the second housing 114B to the second cover 116B. The side cutaway view 100B of accelerometer system 100A further includes band 226. Band 226 may be configured to connect first excitation ring 108A to second excitation ring. In some examples, band 126 may be configured to extend around a circumference of accelerometer system 100A such that excitation rings 108 and band 226 form a secure housing that protects components within the housing from harmful environments.

Accelerometer system 100A may be configured to sense an acceleration along sense axis 101. For example, accelerometer system 100A may be configured to sense an acceleration along sense axis 101 in a first direction 113A. In some cases, accelerometer system 100A precisely determines a magnitude of the acceleration along the sense axis 101 in the first direction 113A in real time or near-real time such that processing circuitry (not illustrated in FIG. 2) may track a position of accelerometer system 100A using dead reckoning. Additionally, or alternatively, accelerometer system 100A may be configured to sense an acceleration along sense axis 101 in a second direction 113B. In some cases, accelerometer system 100A precisely determines a magnitude of the acceleration along the sense axis 101 in the second direction 113B in real time or near-real time such that processing circuitry 102A and processing circuitry 102B may track a position of accelerometer system 100A using dead reckoning.

As seen in FIG. 2, proof mass assembly 103 is suspended between first excitation ring 108A and second excitation ring 108B by outer raised pads 124A-124B (collectively, "outer raised pads 124"). In some examples, the processing circuitry may receive a first sense signal indicative of a width of first capacitive gap 132 and receive a second sense signal indicative of a width of second capacitive gap 134. In turn, the processing circuitry may deliver a first electrical signal to first force rebalance coil 110A and deliver a second electrical signal to second force rebalance coil 110B in order to prevent a displacement of proof mass 104 in response to an acceleration of accelerometer system 100A along sense axis 101. The magnitude of the first electrical signal and the magnitude of the second electrical signal may be correlated with the magnitude of the acceleration.

First excitation ring 108A may include first housing 114A and first cover 116A. First housing 114A and first cover 116A may be removably attached using fastener 120A and fastener 120C. First pole piece 106A may be removably attached to first housing 114A using fastener 120B. When first pole piece 106A and first cover 116A are detached from first housing 114A, it may be possible to place processing circuitry 102A and first electromagnetic coil 109A within first recess 111A and subsequently attach first pole piece 106A and first cover 116A to first housing 114A using fasteners 120, securing processing circuitry 102A and first electromagnetic coil 109A within first recess 111A.

Second excitation ring 108B may include second housing 114B and second cover 116B. Second housing 114B and second cover 116B may be removably attached using fastener 122A and fastener 122C. Second pole piece 106B may be removably attached to second housing 114B using fastener 122B. When second pole piece 106B and second cover 116B are detached from second housing 114N, it may be possible to place processing circuitry 102B and second electromagnetic coil 109B within second recess 111B and subsequently attach second pole piece 106B and second cover 116B to second housing 114B using fasteners 122, securing processing circuitry 102B and second electromagnetic coil 109B within second recess 111B.

Excitation rings 108 may be attached to (e.g., clamped) to outer raised pads 124, securing proof mass assembly 103 between first excitation ring 108A and second excitation ring 108B. The position of proof mass assembly 103 may represent a position of proof mass assembly 103 relative to excitation rings 108. In some examples, excitation rings 108 include metal materials (e.g., metal alloys), which may be part of a magnetic flux loop. In some examples, excitation rings 108 may be similar to stators of a variable capacitor.

Force rebalance coils 110 may, in some cases, conduct electricity such that electrical signals flow through force rebalance coils 110. For example, a first electrical signal may flow through a path of first force rebalance coil 110A and a second electrical signal may flow through a path of second force rebalance coil 110B. The path of first force rebalance coil 110A may form a circular path and the path of second force rebalance coil 110B may form a circular path. Since FIG. 2 represents a cutaway view of accelerometer system 100A, the circular path of first force rebalance coil 110A and the circular path of second force rebalance coil 110B is not illustrated in FIG. 2. Force rebalance coils 110 extend fully around an outer surface of pole pieces 106 such that the first electrical signal flows around the outer surface of pole piece 106A through first force rebalance coil 110A and the second electrical signal flows around the outer surface of pole piece 106B through second force rebalance coil 110B.

Using fasteners 120 to attach first pole piece 106A and first cover 116A to first housing 114A and using fasteners 122 to attach second pole piece 106B and second cover 116B to second housing 114B without using adhesive materials to attach pole pieces 106 and covers 116 to housings 114 may decrease a hysteresis effect in accelerometer system 100A as compared with systems that use adhesive materials to attach magnetic circuit components. Since adhesive materials have different coefficients of thermal expansion than metal alloy materials, using adhesive materials to attach components of a magnetic circuit may cause the magnetic circuit to have a nonuniform coefficient of thermal expansion, which contributes to hysteresis. In some examples, pole pieces 106, housings 114, and covers 116 may have substantially the same coefficient of thermal expansion. This means that the first magnetic circuit through first pole piece 106A and first excitation ring 108A and the second magnetic circuit through second pole piece 106B and second excitation ring 108B may have more uniform coefficients of thermal expansion as compared with magnetic circuits that include adhesive materials at material boundaries.

Band 126 may represent a metal piece which fastens first excitation ring 108A to second excitation ring 108B. In some examples, band 126 may be attached to (e.g., bonded with epoxy) excitation rings 108, when excitation rings 108 are attached to proof mass assembly 103 by outer raised pads 124. The side cutaway view 100B of accelerometer system 100A includes first capacitive gap 132 and second capacitive gap 134. First capacitive gap 132 represents a gap between first capacitive plate 105A and first excitation ring 108A, second capacitive gap 134 represents a gap between second capacitive plate 105B and second excitation ring 108B. First capacitive plate 105A may generate a first sense signal which indicates a first capacitance value. The first capacitance value is correlated with a width of first capacitive gap 232. Second capacitive plate 105B may generate a second sense signal which indicates a second capacitance value. The second capacitance value is correlated with a width of second capacitive gap 234. In this way, first capacitive plate 105A may represent first sensor 112A of FIG. 1 and second capacitive plate 105B may represent second sensor 112B of FIG. 1. Processing circuitry (not illustrating in FIG. 2) may receive the first sense signal and the second signal and control electrical signals delivered to force rebalance coils 110 based on the first sense signal and the second sense signal.

A null width of first capacitive gap 132 may, in some examples, be defined by a width of outer raised pads 124. In some examples, the null width of first capacitive gap 132 is within a range from 0.0005 inches to 0.0025 inches. In some examples, the null width of first capacitive gap 132 is within a range from 0.0007 inches to 0.0008 inches. In some examples, the null width of first capacitive gap 132 is 0.00075 inches. A null width of second capacitive gap 134 may, in some examples, be defined by a width of outer raised pads 124. In some examples, the null width of second capacitive gap 134 is within a range from 0.0005 inches to 0.0025 inches. In some examples, the null width of second capacitive gap 134 is within a range from 0.0007 inches to 0.0008 inches. In some examples, the null width of second capacitive gap 134 is 0.00075. When the width of first capacitive gap 132 is at the null width of first capacitive gap 132 and the width of second capacitive gap 134 is at the null width of second capacitive gap 134, proof mass 104 may be located at a null position. That is, proof mass 104 may be located at the null position such that the processing circuitry is configured to determine the acceleration along sense axis 101 based on the first electrical signal delivered to first force rebalance coil 110A and the second electrical signal delivered to second force rebalance coil 110B.

In some examples, first capacitive gap 132 may have a first capacitance value. Processing circuitry 102A may detect the first capacitance value of first capacitive gap 132, in order to determine the acceleration of accelerometer system 100A. Additionally, second capacitive gap 134 may have a second capacitance value. Processing circuitry 102B may detect the second capacitance value of second capacitive gap 134, in order to determine the acceleration of accelerometer system 100A. In some examples, an increase in a width of first capacitive gap 132 and a decrease in a width of second capacitive gap 134 may be indicative of an acceleration of accelerometer system 100A in first direction 113A. Conversely, an increase in the width of second capacitive gap 134 and a decrease in the width of first capacitive gap 132 may be indicative of an acceleration of accelerometer system 100A in the second direction 113B. Processing circuitry 102A may deliver the first electrical signal to first force rebalance coil 110A and processing circuitry 102B may deliver the second electrical signal to second force rebalance coil 110B in order to counter-balance a displacement of proof mass 104 from the null position. It may be possible to determine the magnitude and the direction of the acceleration along sense axis 101 based on the magnitude of the first electrical signal and the magnitude of the second electrical signal.

Electromagnetic coils 109 may provide a magnetic field to drive magnetic circuits through pole pieces 106, force rebalance coils 110, and excitation rings 108. For example, electromagnetic coil 109A may induce a first magnetic flux which travels from pole piece 106A through force rebalance coil 110A to cover 116A, travels through the cover 116A, and returns to pole piece 106A through the housing 114A in order to complete a first magnetic circuit. Additionally, or alternatively, electromagnetic coil 109B may induce a second magnetic flux which travels from pole piece 106B through force rebalance coil 110B to cover 116B, travels through the cover 116B, and returns to pole piece 106B through the housing 114B in order to complete a second magnetic circuit. In some examples, processing circuitry 102A may control first electromagnetic coil 109A to apply a first magnetic force which induces the first magnetic flux through the first magnetic circuit. In some examples, processing circuitry 102B may control second electromagnetic coil 109B to apply a second magnetic force which induces the second magnetic flux through the second magnetic circuit.

In some examples, processing circuitry 102A and processing circuitry 102B may adjust the magnetic force applied by first electromagnetic coil 109A and second electromagnetic coil 109A based on a temperature of the accelerometer system 100A. Although components of the first magnetic circuit and the second magnetic circuit (e.g., pole pieces 106 and excitation rings 108) have low coefficients of thermal expansion, components of the first magnetic circuit and the second magnetic circuit may have nonzero coefficients of thermal expansion. This means that components of the first magnetic circuit and the second magnetic circuit may slightly expand or contract based on a temperature of accelerometer system 100A. The first magnetic flux and the second magnetic flux may be affected by the temperature of accelerometer system 100A. Processing circuitry 102A and processing circuitry 102B control the magnetic force applied by first electromagnetic coil 109A and second electromagnetic coil 109A such that the first Lorentz force and the second Lorentz force maintain the proof mass 104 in the null position across a wide range of temperatures of accelerometer system 100A.

As seen in FIG. 2, band 126 and excitation rings 108 may form a protective housing that secures one or more components within the protective housing. For example, processing circuitry 102A is located within a first recess 111A that is enclosed by the protective housing, and processing circuitry 102B is located withing a second recess 111B that is enclosed by the protective housing. The protective housing formed by excitation rings 108 and band 126 may protect processing circuitry 102A and 102B from one or more harmful environments. These harmful environments may include potentially damaging levels of gamma radiation, cosmic rays, high-energy particles, or any combination thereof. Excitation rings 108 and band 126 may be formed from one or more materials (e.g., metal alloys) that block potentially damaging levels of gamma radiation, cosmic rays, and high-energy particles found within harmful environments.

Pole pieces 106 may represent magnetic structures that enable magnetic fields to be focused and drive magnetic flux through pole pieces 106, force rebalance coils 110, and excitation rings 108. For example, pole pieces 106 may be magnetic structures that enable a magnetic field to turn a corner and flow through force rebalance coils 110. By allowing the magnetic field to travel through force rebalance coils 110, the magnetic field may enter excitation rings 108 and flow back to the pole piece completing the magnetic circuit. In some examples, pole pieces 106 may be part of a zero gauge configuration of accelerometer system 100A. In some examples, pole pieces 106 comprise a permeable material such as invar, Mu Metal, Permalloy, or other such material. In some examples, pole pieces 106 and excitation rings 108 may comprise a same material. In some examples, pole pieces 106, excitation rings 108, fasteners 120, and fasteners 122 may comprise a same material.

In some examples, accelerometer system 100A may include force rebalance coils 110 attached on each side of proof mass 104. Accelerometer system 100A may include processing circuitry 102A configured to deliver a first electrical signal to force rebalance coil 110A and processing circuitry 102B configured to deliver a second electrical signal to force rebalance coil 110B in order to position proof mass 104 at the null position. In some examples, when accelerometer system 100A accelerates along sense axis 101, processing circuitry 102A may set an electrical current magnitude of the first electrical signal and processing circuitry 102B may set an electrical current magnitude of the second electrical signal to maintain the proof mass 104 at the null position. In this example, it may be possible to determine the magnitude and/or the direction of the acceleration along the sense axis 101 based on one or more parameters of the first electrical signal flowing through first force rebalance coil 110A and one or more parameters of the second electrical signal flowing through second force rebalance coil 110B. Additionally, or alternatively, it may be possible to determine the magnitude and/or the direction of the acceleration along the sense axis 101 based on one or more parameters of the first magnetic flux flowing across first force rebalance coil 110A and one or more parameters of the second magnetic flux flowing across second force rebalance coil 110B.

Preventing proof mass 104 from displacing from the null position may be referred to herein as the "servo effect." In some examples, processing circuitry 102A and processing circuitry 102B may cause one or more Lorentz forces to counter-balance an acceleration force applied to proof mass 104 such that proof mass 104 does not move from the null position. This means that processing circuitry 102A and processing circuitry 102B are configured to adjust the one or more Lorentz forces in real time or near-real time such that the one or more Lorentz forces counter-balance the acceleration force applied to proof mass 104 at any given time, thus constantly maintaining the proof mass 104 at the null position. A Lorentz force may represent a force that results from interaction between a magnetic current and a magnetic flux. For example, a first Lorentz force may result from an interaction between a first electrical current flowing through first force rebalance coil 110A and a first magnetic flux flowing across first force rebalance coil 110A. A second Lorentz force may result from an interaction between a second electrical current flowing through second force rebalance coil 110B and a second magnetic flux flowing across second force rebalance coil 110B.

The electrical signals required to induce the one or more Lorentz forces may be generated by the processing circuitry 102A and processing circuitry 102B based on the first sense signal received from first capacitive plate 105A and the second sense signal received from the second capacitive plate 105B. Processing circuitry 102A and processing circuitry 102B Force rebalance coils 110 may be mounted on either side of proof mass 104 of proof mass assembly 103. In some examples, processing circuitry may modify the current in force rebalance coils 110 to servo proof mass 104 to maintain the null position. Any acceleration of accelerometer system 100A will momentarily move the proof mass of proof mass assembly 103 out of the plane of the null position and the increase in current required to maintain proof mass 104 in the null position is proportional to the magnitude of the acceleration of accelerometer system 100A along sense axis 101.

Although FIG. 2 illustrates a side cutaway view 100B of accelerometer system 100A with a capacitive plate and a coil on both sides of proof mass assembly 103 to form a combined capacitive pick-off system, accelerometer system 100A may function with a capacitor plate and a coil on only one side of proof mass assembly 103. Similarly, although FIG. 2 illustrates the side cutaway view 100B of accelerometer system 100A with a non-moving member on both sides of proof mass assembly 103 to form the combined capacitive pick-off system, accelerometer system 100A may function a non-moving member and a capacitor plate on the same side of proof mass assembly 103.

Figure 3:
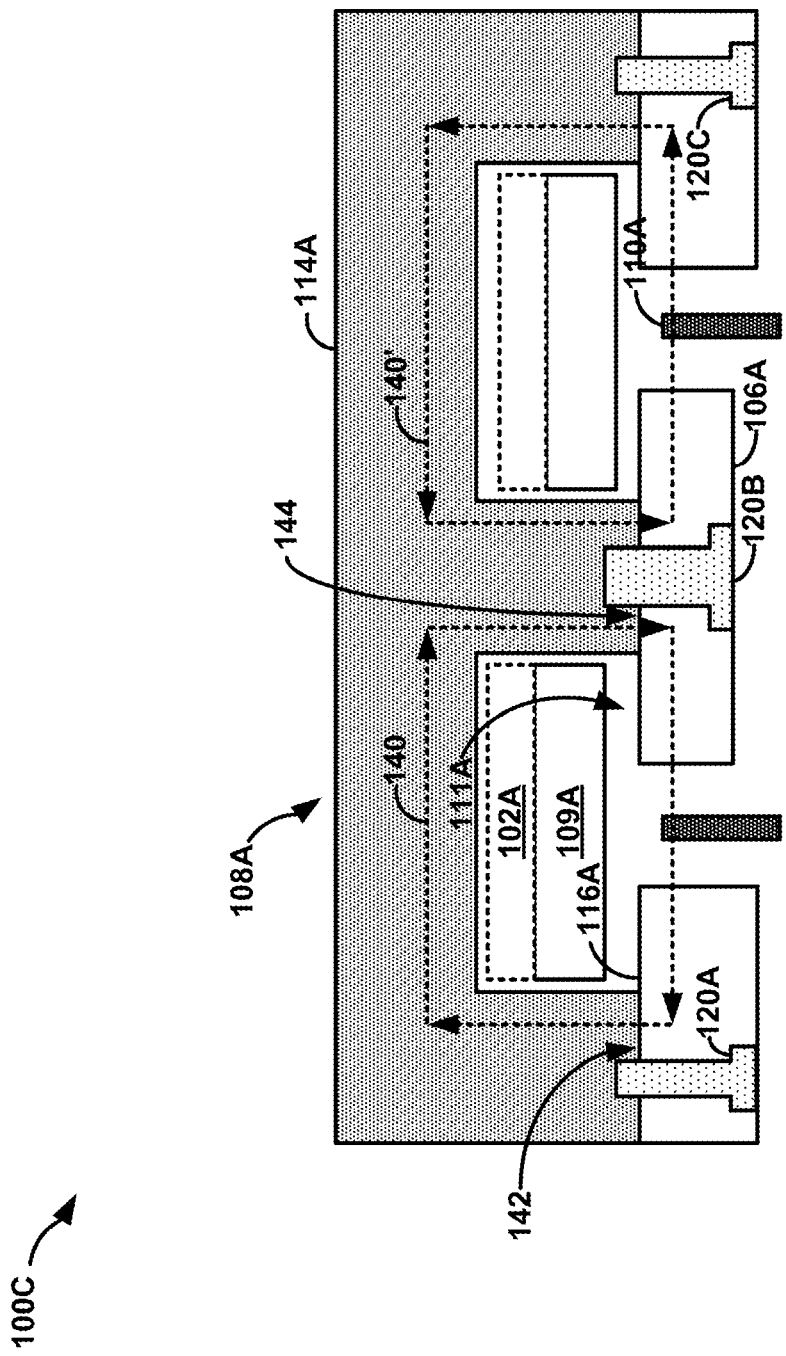
FIG. 3 is a conceptual diagram illustrating a magnetic flux 140 through a side cutaway view of the accelerometer system of FIG. 1, in accordance with one or more techniques of this disclosure.

FIG. 3 is a conceptual diagram illustrating a magnetic flux 140 through a side cutaway view 100C of the accelerometer system 100A of FIG. 1, in accordance with one or more techniques of this disclosure. In some examples, the side cutaway view 100C of FIG. 3 may represent an upper portion of the side cutaway view 100B of FIG. 2. As seen in FIG. 3, the side cutaway view 100C of the accelerometer system 100A includes processing circuitry 102A, first pole piece 106A, first excitation ring 108A, first electromagnetic coil 109A, first force rebalance coil 110A, and fasteners 120A-120C. First excitation ring 108A includes first housing 114A and first cover 116A.

Magnetic flux 140 may flow through a magnetic circuit of accelerometer system 100A. Processing circuitry 102A may control the first electromagnetic coil 109A to induce the magnetic flux 140. As seen in FIG. 3, the magnetic flux 140 may flow from pole piece 106A across first force rebalance coil 110A to first cover 116A. Magnetic flux 140 may flow through cover 116A to housing 114A across boundary 142. Magnetic flux 140 may complete the magnetic circuit by flowing through housing 114A back to pole piece 106A across boundary 144. Consequently, magnetic flux 140 may complete the magnetic circuit by flowing across two boundaries between materials, boundary 142 and boundary 144, and flowing across one gap that includes first force rebalance coil 110A.

By inducing magnetic flux 140 using the first electromagnetic coil 109A such that magnetic flux 140 can complete the magnetic circuit without passing through first electromagnetic coil 109A, accelerometer system 100A may decrease an effect of hysteresis as compared with accelerometer systems where magnetic flux flows through the source of the flux in order to complete a magnetic circuit. Hysteresis is a magnetic phenomenon where a change in the magnitude of magnetic flux lags behind a change in the magnitude of magnetic force. In other words, when processing circuitry 102A controls electromagnetic coil 109A to increase a magnitude of a magnetic force, the magnitude of the magnetic flux 140 may increase, but the increase of the magnitude of the magnetic flux 140 may lag behind the increase of the magnitude of the magnetic force due to hysteresis. By locating the electromagnetic coil 109A within first recess 111A so that magnetic flux 140 can complete the magnetic circuit without passing through first electromagnetic coil 109A, accelerometer system 100A may decrease a lag between changes in the magnitude of the magnetic force applied by electromagnetic coil 109A and changes in the magnitude of magnetic flux 140.

Material boundaries may contribute to hysteresis in electromagnetic accelerometer system. Consequently, a system with a greater number of material boundaries in a magnetic circuit may exhibit a larger hysteresis effect than a system with a smaller number of material boundaries in a magnetic circuit. Adhesives used to connect materials that form a magnetic circuit may have different coefficients of thermal expansion than the materials themselves. When a magnetic circuit includes materials having differing coefficients of thermal expansion, this may contribute to hysteresis. Although the magnetic circuit of accelerometer system 100A includes a boundary 142 between cover 116A and housing 114A and boundary 144 between housing 114A and pole piece 106A, the magnetic circuit does not include any boundaries between electromagnetic coil 109A and the materials of excitation ring 108A, because electromagnetic coil 109A is located outside of the magnetic circuit within first recess 111A.

In some examples, magnetic flux 140' may represent another perspective of magnetic flux 140. The side cutaway view 100C may represent a cutaway view of a round accelerometer. Pole piece 106A may be located at a center of the round accelerometer, and the magnetic circuit may be arranged such that the magnetic flux 140 and 140' flows outward from the outer circumference of the round pole piece 106A towards the inner circumference of the cover 116A through the force rebalance coil 110A. Magnetic flux 140 and magnetic flux 140' may flow back to the pole piece 106A from the outer portion of cover 116A and housing 114A. In other words, magnetic flux 140' and magnetic flux 140 may represent different pathways of the same magnetic flux generated by electromagnetic coil 109A.

Figure 4:
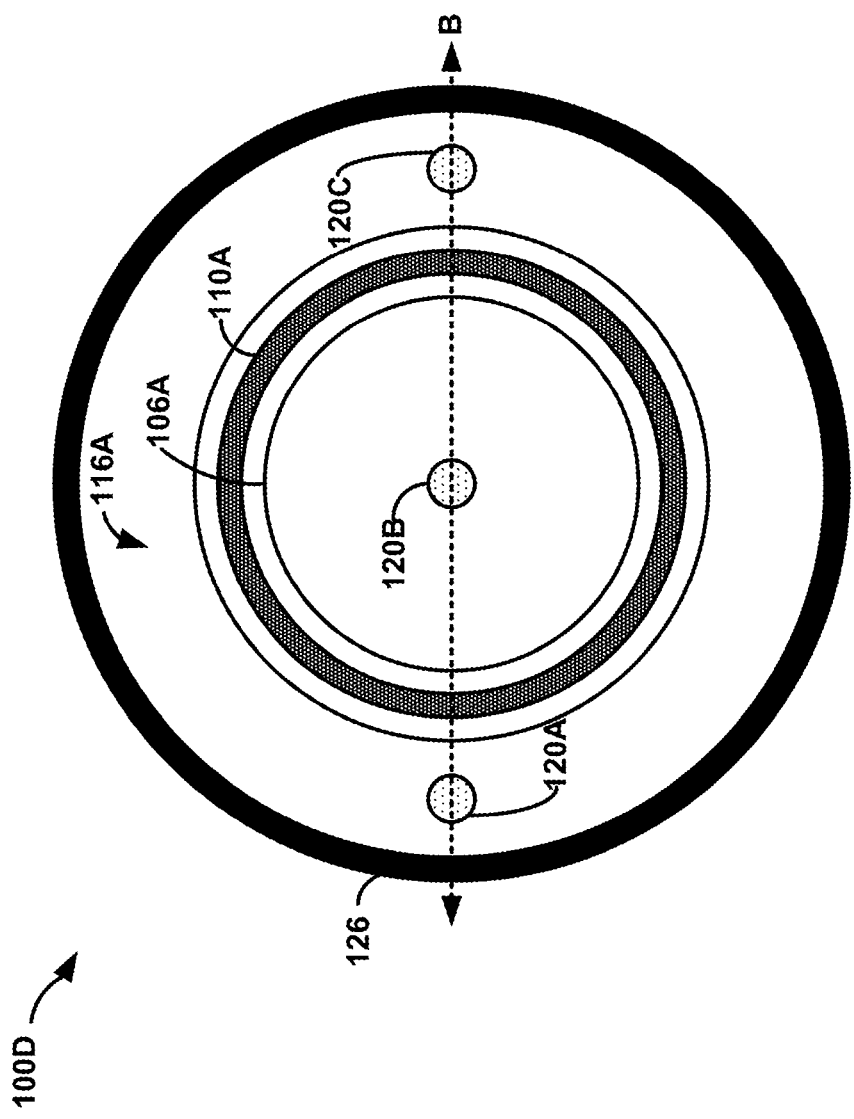
FIG. 4 is a conceptual diagram illustrating a first horizontal cutaway view of the accelerometer system of FIG. 1, in accordance with one or more techniques of this disclosure.

FIG. 4 is a conceptual diagram illustrating a first horizontal cutaway view 100D of the accelerometer system 100A of FIG. 1, in accordance with one or more techniques of this disclosure. The horizontal cutaway view 100D shown in FIG. 4 may represent a cross section of the accelerometer system 100A of FIG. 1 along the cutaway line A shown in the side cutaway view 100B. In other words, first horizontal cutaway view 100D may represent the parts of the accelerometer system 100A that extend into the page of FIG. 2 from cutaway line A and extend out of the page of FIG. 2 from cutaway line A. As seen in FIG. 4, the horizontal cross-section of the accelerometer system is round in shape, whereas the vertical cross-section of the accelerometer system shown in FIG. 2 is rectangular shape. The vertical cutaway view shown in FIG. 2 may represent a cross-section of the system along the cutaway line B illustrated in FIG. 4.

The first horizontal cutaway view 100D may include pole piece 106A, force rebalance coil 110A, cover 116A, fasteners 120A-120C, and band 126. Pole piece 106A fits within a center of the force rebalance coil 110A. Force rebalance coil 110A fits within a gap between pole piece 106A and cover 116A. This means that magnetic flux may flow outwards from the outer circumference of pole piece 106A through the force rebalance coil 110A to the inner circumference of cover 116A. Band 126 may, in some cases, extend fully around the outer circumference of cover 116A. By extending fully around the outer circumference of cover 116A, band 126 may secure the first excitation ring 108A and the second excitation ring 108N (as illustrated in FIG. 2) such that a space within the first excitation ring 108A and the second excitation ring 108B is protected from one or more harmful environments.

Figure 5:
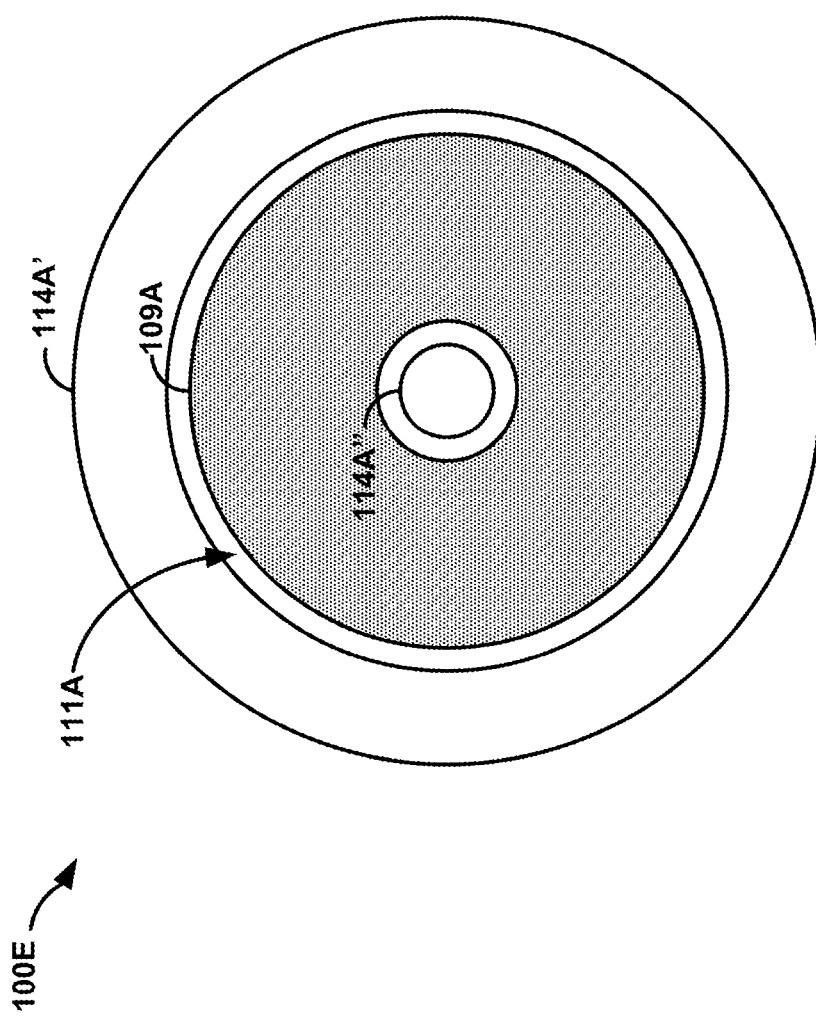
FIG. 5 is a conceptual diagram illustrating a second horizontal cutaway view of the accelerometer system of FIG. 1, in accordance with one or more techniques of this disclosure.

FIG. 5 is a conceptual diagram illustrating a second horizontal cutaway view 100E of the accelerometer system 100A of FIG. 1, in accordance with one or more techniques of this disclosure. The second horizontal cutaway view 100E shown in FIG. 5 may represent a cross section of the accelerometer system 100A of FIG. 1 along the cutaway line A' shown in the side cutaway view 100B shown in FIG. 2. In other words, the second horizontal cutaway view 100E may represent the parts of the system that extend into the page of FIG. 2 from cutaway line A' and extend out of the page of FIG. 2 from cutaway line A. As seen in FIG. 5, the horizontal cross-section of the accelerometer system is round in shape, whereas the vertical cross-section of the accelerometer system shown in FIG. 2 is rectangular shape.

As seen in FIG. 5, electromagnetic coil 109A is located within a first recess 111A between two portions of the housing 114A of first excitation ring 108A. The outer portion 114A' of the housing 114A may be connected to the inner portion 114A" of housing 114A outside of the plane of FIG. 5 such that the outer portion 114A' and the inner portion 114A" are both part of the same single piece of material which forms housing 114A. For example, as seen in FIG. 2, cutaway line A' extends through the outer portion and the inner portion of housing 114A, and extends through first recess 111A. The inner portion of housing 114A is connected to the outer portion of housing 114A above the cutaway line A' such that housing 114A represents a single piece of material.

In some examples, magnetic flux may travel from the outer portion 114A' of the housing 114A to the inner portion 114A" of housing 114A through the single piece of material such that the magnetic flux travels around electromagnetic coil 109A which is located within first recess 111A. Although electromagnetic coil 109A may induce a magnetic flux which flows through the housing 114A, the magnetic flux may flow around first recess 111A such that the magnetic flux completes a magnetic circuit without flowing through electromagnetic coil 109A.

It may be beneficial for electromagnetic coil 109A to be located within first recess 111A such that a magnetic flux generated by electromagnetic coil 109A may complete a magnetic circuit without passing through electromagnetic coil 109A. Accelerometer systems where the source of the magnetic flux is not part of the magnetic circuit completed by the magnetic flux may exhibit a smaller hysteresis effect as compared with accelerometer systems where the source of the magnetic flux is part of the magnetic circuit completed by the magnetic flux. In other words, by locating the electromagnetic coil 109A within the first recess 111A outside of the magnetic circuit that is completed by magnetic flux generated by electromagnetic coil 109A, the accelerometer system 100A may exhibit a smaller lag between a change in magnetic force and a change in magnetic flux as compared with accelerometer systems where the source of the magnetic flux is part of the magnetic circuit.

In some examples, processing circuitry 102A may be located within the first recess 111A. Processing circuitry 102A may be located within the first recess 111A outside of the plane of FIG. 5. For example, as seen in FIG. 2, processing circuitry 102A may be located within the first recess 111A above the cutaway line A' and above the electromagnetic coil 109A. This is not the only possible configuration within first recess 111A. Processing circuitry 102B may be located below electromagnetic coil 109A, on the outside of electromagnetic coil 109A, or on the inside of electromagnetic coil 109A. In any case, by placing processing circuitry 102A within first recess 111A, the accelerometer system may protect processing circuitry 102A from one or more harmful environments.

Figure 6:
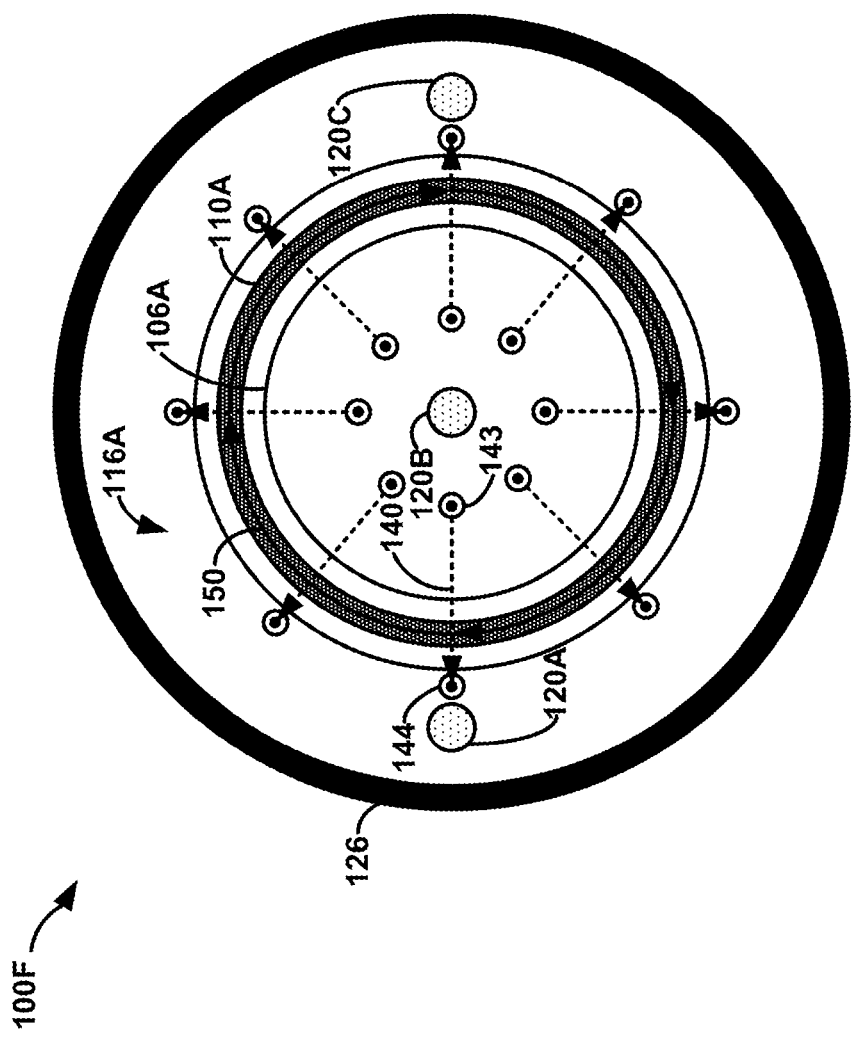
FIG. 6 is a conceptual diagram illustrating a flow of magnetic flux and electrical current through a horizontal cutaway view of the accelerometer system of FIG. 1, in accordance with one or more techniques of this disclosure.

FIG. 6 is a conceptual diagram illustrating a flow of magnetic flux 140 and electrical current 150 through a horizontal cutaway view 100F of the accelerometer system 100A of FIG. 1, in accordance with one or more techniques of this disclosure. In some examples, the horizontal cutaway view 100F shown in FIG. 6 is substantially the same as the first horizontal cutaway view 100D of FIG. 4, except that horizontal cutaway view 100F of FIG. 6 includes a magnetic flux 140.

As seen in FIG. 6, magnetic flux 140 flows through pole piece 106A such that magnetic flux 140 enters the plane of FIG. 6 from above the plane of FIG. 6 at point 143. The magnetic flux 140 may travel from point 143 through pole piece 106A to an outer circumference of pole piece 106A. Magnetic flux 140 may travel from the outer circumference of pole piece 106 to an inner circumference of cover 116A across force rebalance coil 110A. When the magnetic flux 140 travels across force rebalance coil 110A to point 144 within cover 116A, the magnetic flux may travel outside of the plane of FIG. 6 from point 144. In some examples, the magnetic flux 140 may travel upwards from the plane of FIG. 6 from point 144 through cover 116A, and complete a magnetic circuit by traveling through housing 114A.

Magnetic flux 140 may flow outward from pole piece 106A at any point along the outer circumference of pole piece 106A. In some examples, magnetic flux 140 may travel substantially perpendicular to a tangent line at any point along the outer circumference of pole piece 106A. This means that magnetic flux 140 may radiate outwards from pole piece 106A from the outer circumference of pole piece 106A. The plane entry point 143 and exit point 144 are not the only possible entry and exit points. Magnetic flux may enter the plane of FIG. 6 from any point on pole piece 106A and exit the plane of FIG. 6 from any point on cover 116A.

An electrical current 150 may flow through force rebalance coil 110A to complete an electrical circuit. Magnetic flux may travel across the force rebalance coil 110A perpendicular to the electrical current 150 flowing through the force rebalance coil 110A. The interaction between the magnetic flux 140 and the electrical current 150 may create a Lorentz force which counteracts an acceleration of the accelerometer system. In some examples, a magnitude of the Lorentz force may be a cross product of a magnitude of the magnetic flux 140 with a magnitude of the electrical current 150. In some examples, processing circuitry (e.g., processing circuitry 102A) may control a magnitude of the electrical current 150 such that the Lorentz force maintains a proof mass (e.g., proof mass 104) in a null position. Acceleration of the accelerometer system may apply an acceleration force to the proof mass such that the proof mass will displace from the null position unless an equal and opposite Lorentz force is applied. The processing circuitry may control the magnitude of the electrical current 150 such that, at any given time, the cross product of the magnitude of the electrical current 150 and the magnitude of the magnetic flux 140 is equal and opposite to the acceleration force applied to the proof mass.

Figure 7:
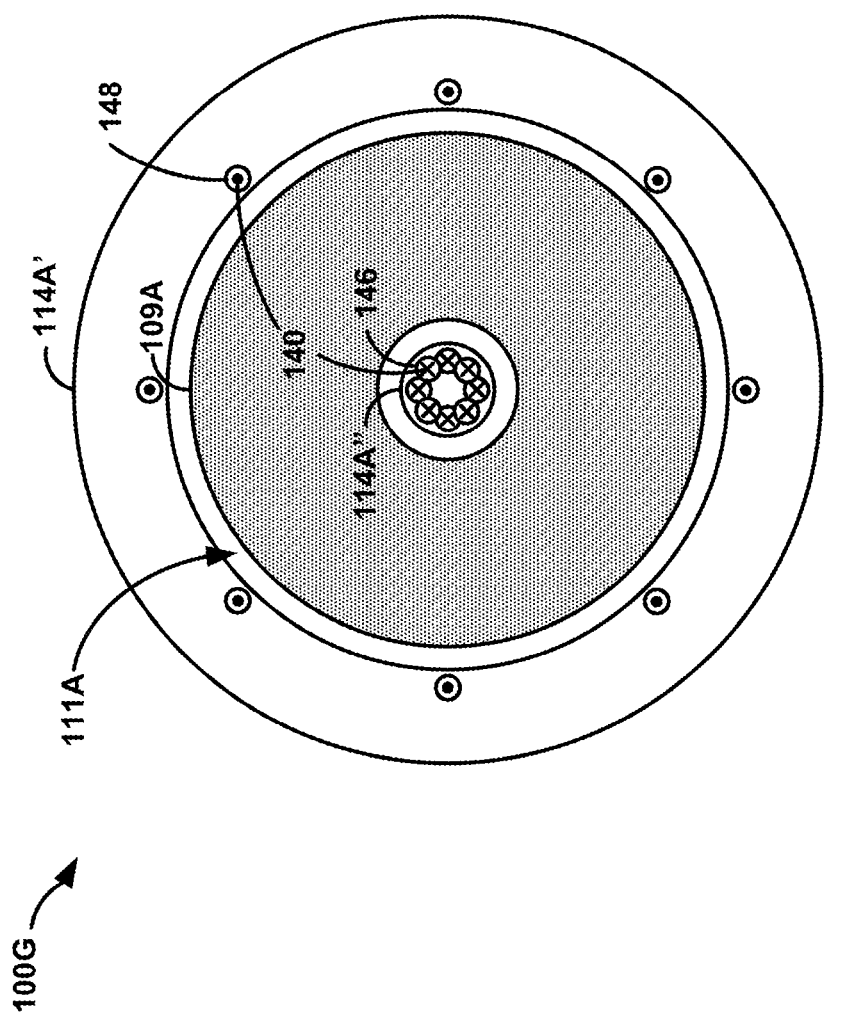
FIG. 7 is a conceptual diagram illustrating a flow of magnetic flux through a horizontal cutaway view of the accelerometer system of FIG. 1, in accordance with one or more techniques of this disclosure.

FIG. 7 is a conceptual diagram illustrating a flow of magnetic flux 140 through a horizontal cutaway view 100G of the accelerometer system 100A of FIG. 1, in accordance with one or more techniques of this disclosure. In some examples, the horizontal cutaway view 100G shown in FIG. 7 is substantially the same as the second horizontal cutaway view 100E of FIG. 5, except that the horizontal cutaway view 100G of FIG. 7 includes a magnetic flux.

In some examples, magnetic flux 140 may flow into the plane of FIG. 7 at point 146 and other points marked "X" within the center portion 114A" of housing 114A. The points marked "X" are not necessarily the only points which carry magnetic flux. In some examples, a continuous flow of magnetic flux may pass through the center portion 114A" of housing 114A throughout all parts of the center portion 114A". In some examples, the center portion 114A" of housing 114A may be connected to the pole piece 106A below the plane of FIG. 7, so magnetic flux 140 may flow into the plane of FIG. 7 through the center portion 114A" to reach pole piece 106A. The magnetic flux 140 may flow outwards from the pole piece 106A back to the cover 116A of the excitation ring 108A across the force rebalance coil 110A.

The magnetic flux 140 may flow upwards from the cover 116A through the outer portion 114A' of housing 114A. The magnetic flux 140 may flow upwards through point 148 and other points marked "•" The points marked "•" are not necessarily the only points which carry magnetic flux. In some examples, a continuous flow of magnetic flux may pass through the outer portion 114A' of housing 114A throughout all parts of the outer portion 114A'. The magnetic flux 140 may travel upwards through the outer portion 114A' and complete the magnetic circuit by returning to the pole piece 106A through the center portion 114A" of the housing 114A.

Figure 8:
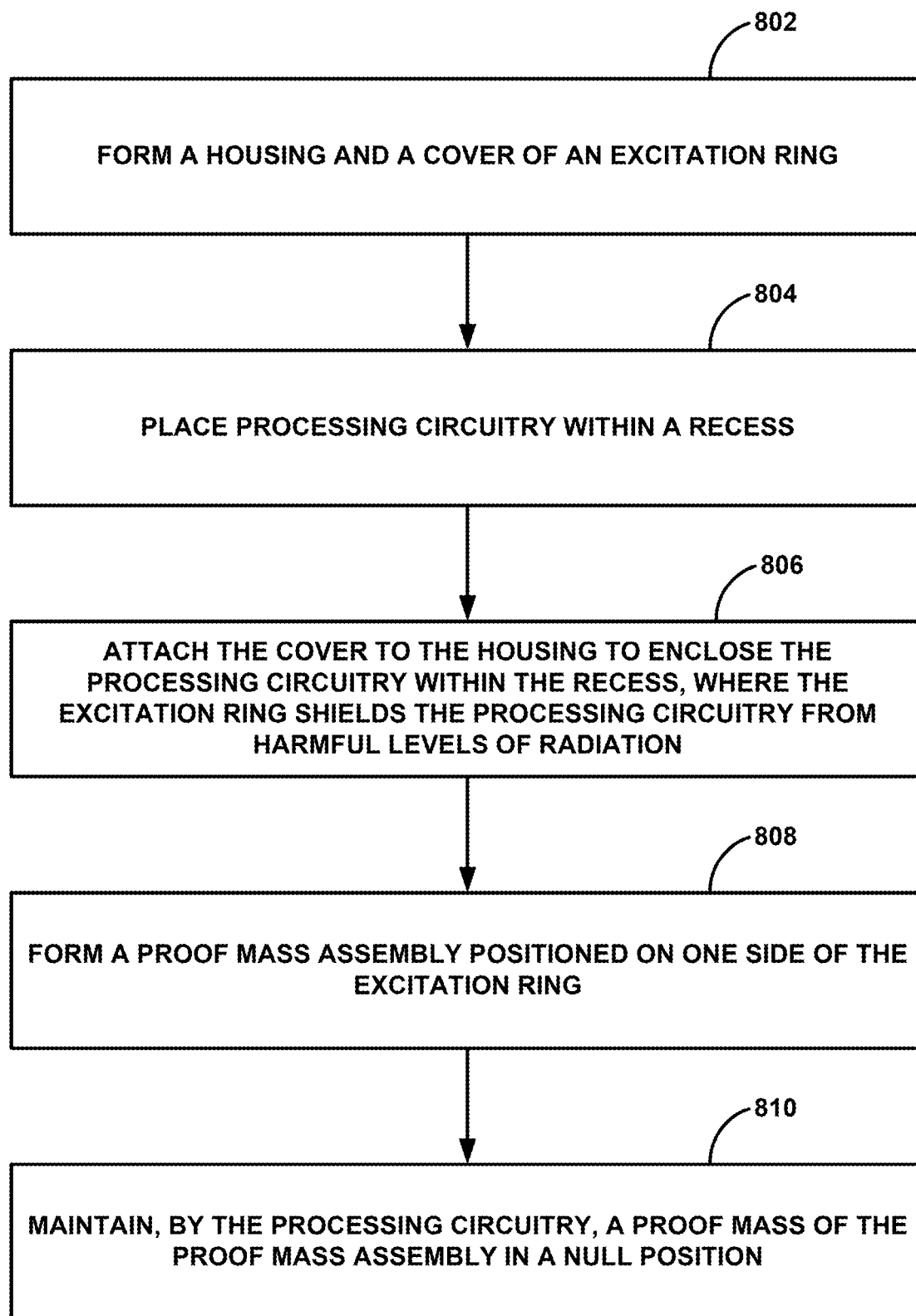
FIG. 8 is a flow diagram illustrating a first example operation for forming an accelerometer system, in accordance with one or more techniques of this disclosure.

FIG. 8 is a flow diagram illustrating a first example operation for forming an accelerometer system, in accordance with one or more techniques of this disclosure. FIG. 8 is described with respect to accelerometer system 100A of FIG. 1. However, the techniques of FIG. 8 may be performed by different components of accelerometer system 100A or by additional or alternative devices.

A housing 114A and a cover 116A of an excitation ring 108A may be formed, wherein the housing 114A at least partially defines a recess 111A (802). Recess 111A may be formed when cover 116A is attached to housing 114A. For example, one or more objects may be placed in recess 111A when cover 116A is detached from housing 114A. When cover 116A is attached to housing 114A, the one or more objects may be secured within the recess. For example, processing circuitry 102A may be placed within recess 111A (804) formed by housing 114A, and cover 116A may be attached to housing 114A to enclose the processing circuitry 102A within the recess 111A, where the excitation ring 108A shields the processing circuitry 102A from harmful levels of radiation (806). The housing 114A and the cover 116B may comprise a material configured to prevent harmful levels of radiation existing outside of the accelerometer system 100A from entering the recess 111A. The material of the housing 114A and the cover 116B may, in some examples, comprise a metal alloy (e.g., invar). In some examples, the harmful levels of radiation may comprise at least one of harmful levels of gamma radiation, harmful levels of cosmic rays, or harmful levels of high-energy particles.

An operation of processing circuitry 102A may be negatively affected by harmful levels of radiation. Accelerometer system 100A may sometimes travel to locations (e.g., outer space) that contain harmful levels of radiation. Therefore, it may be beneficial for accelerometer system 100A to include a recess 111A for housing processing circuitry 102A, where the recess 111A is isolated from the environment outside of the accelerometer system 100A. Housing 114A and the cover 116A of the excitation ring 108A may be configured to block, or attenuate, radiation in the environment outside of accelerometer system 100A to protect processing circuitry 102A.

A proof mass assembly 103 may be formed, the proof mass assembly 103 positioned on one side of the excitation ring 108A (808). In some examples, the accelerometer system 100A may apply an acceleration force to a proof mass 104 of the proof mass assembly 103, the acceleration force causing the proof mass 104 to displace from a null position unless forces are generated to counteract the acceleration force. The accelerometer system 100A may generate one or more forces in order to counteract the acceleration force, and determine the acceleration based on one or more parameters of signals used to generate the counteracting forces.

Processing circuitry 102A may be configured to maintain a proof mass 104 of the proof mass assembly 103 in a null position (810). For example, processing circuitry 102A may control an electrical current flowing through force rebalance coil 110A. additionally, or alternatively, processing circuitry 102A may control electromagnetic coil 109A to generate a magnetic flux that flows through a magnetic circuit and across the force rebalance coil 110A. An interaction between the electrical current flowing through force rebalance coil 110A and the magnetic flux flowing across force rebalance coil 110A may produce a Lorentz force which counteracts an acceleration force applied to proof mass 104. Processing circuitry 102A may determine the acceleration based on the amount of electrical current and/or the amount of magnetic flux required to produce a Lorentz force that maintains the proof mass 104 in the null position.

Figure 9:
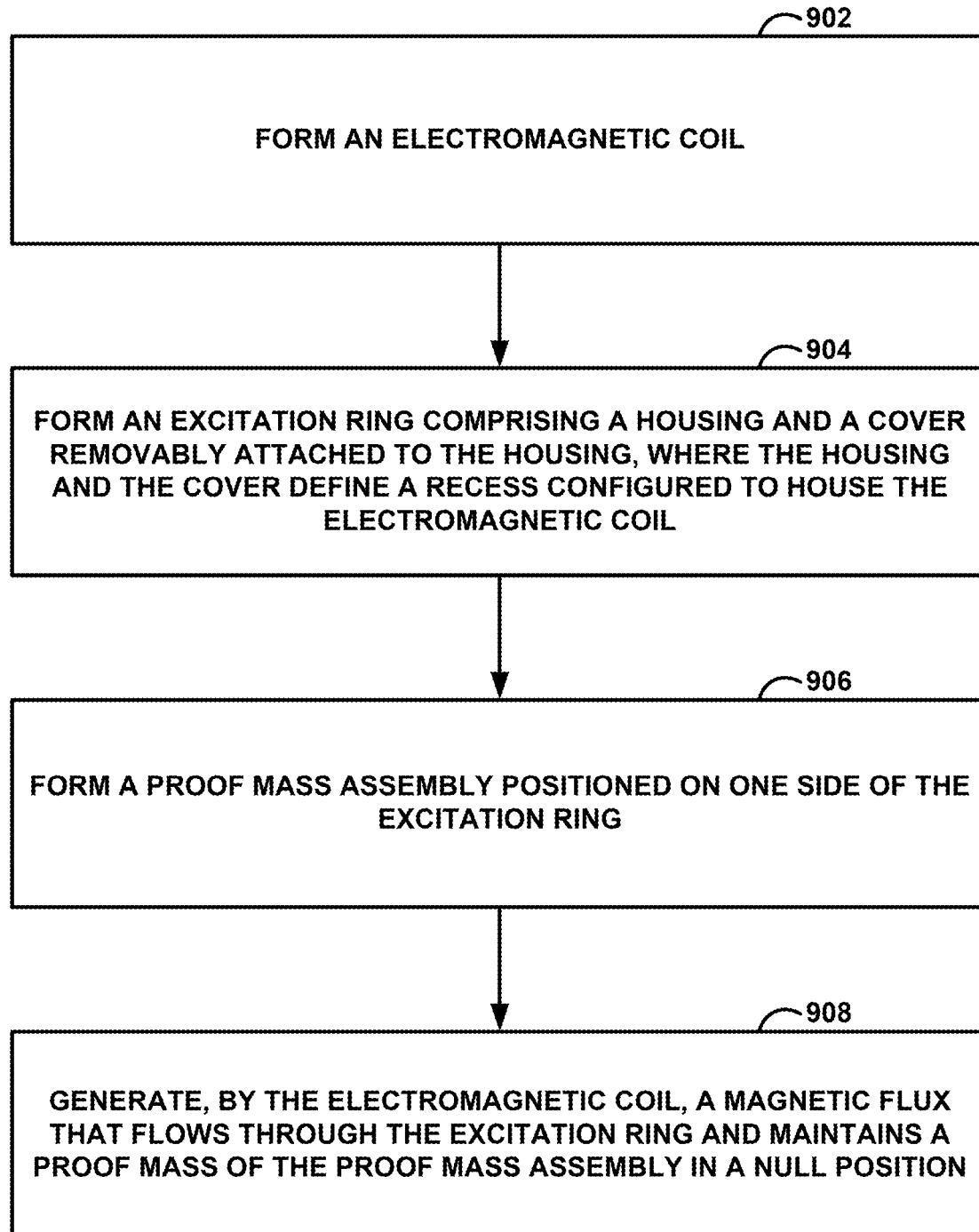
FIG. 9 is a flow diagram illustrating a second example operation for forming an accelerometer system, in accordance with one or more techniques of this disclosure.

FIG. 9 is a flow diagram illustrating a second example operation for forming an accelerometer system, in accordance with one or more techniques of this disclosure. FIG. 9 is described with respect to accelerometer system 100A of FIG. 1. However, the techniques of FIG. 9 may be performed by different components of accelerometer system 100A or by additional or alternative devices.

An electromagnetic coil 109A may be formed (902). An excitation ring 108A comprising a housing 114A and a cover 116A may be formed, the cover 116A may be removably attached to the housing 114A, where the housing 114A and the cover 116A define a recess 111A configured to house the electromagnetic coil 109A (904). By including the electromagnetic coil 109A within the recess 111A, the electromagnetic coil 109A may generate a magnetic flux that completes a magnetic circuit without traveling through electromagnetic coil 109A. Magnetic circuits that do not include the source of magnetic flux may have a lower hysteresis effect as compared with magnetic circuits that include the source of magnetic flux.

A proof mass assembly 103 may be formed, and positioned on one side of the excitation ring 108A (906). When accelerometer system 100A accelerates, the proof mass 104 may be displaced from a null position unless accelerometer system 100A generates one or more forces that counteract an acceleration force caused by the acceleration. Electromagnetic coil 109A may generate a magnetic flux that flows through the excitation ring 108A and maintains the proof mass 104 in the null position (908). For example, proof mass assembly 103 may include a force rebalance coil 110A. The magnetic flux generated by electromagnetic coil 109A may flow across the force rebalance coil 110A and interact with an electrical current flowing through force rebalance coil 110A to generate a Lorentz force that counteracts the acceleration force.

The following numbered clauses may demonstrate one or more aspects of the disclosure.

Clause 1: An accelerometer system includes a first excitation ring comprising: a first housing; and a first cover removably attached to the first housing, wherein the first housing and the first cover define a first recess. Additionally, the accelerometer system includes a second excitation ring comprising: a second housing; and a second cover removably attached to the second housing, wherein the second housing and the second cover define a second recess. The accelerometer system also includes a proof mass assembly positioned between the first excitation ring and the second excitation ring; and processing circuitry located within one or both of the first recess and the second recess, wherein the first excitation ring and the second excitation ring shield the processing circuitry from harmful levels of radiation existing outside of the accelerometer system, and wherein the processing circuitry is configured to maintain a proof mass of the proof mass assembly in a null position.

Clause 2: The accelerometer system of clause 1, wherein the first housing, first cover, second housing, and second cover comprise a material configured to prevent the harmful levels of radiation existing outside of the accelerometer system from entering the first recess and the second recess.

Clause 3: The accelerometer system of any of clauses 1-2, wherein the material comprises a metal alloy.

Clause 4: The accelerometer system of any of clauses 1-3, wherein the material comprises invar.

Clause 5: The accelerometer system of any of clauses 1-4, wherein the harmful levels of radiation may comprise at least one of harmful levels of gamma radiation, harmful levels of cosmic rays, or harmful levels of high-energy particles.

Clause 6: The accelerometer system of any of clauses 1-5, further comprising a band that connects the first excitation ring and the second excitation ring and extends around an outer circumference of the accelerometer system such that the band covers a gap between the first excitation ring and the second excitation ring, the band further protecting the processing circuitry located within one or both of the first recess and the second recess from the harmful levels of radiation outside of the accelerometer system.

Clause 7: The accelerometer system of any of clauses 1-6, wherein the proof mass assembly comprises: a first force rebalance coil located on a first surface of the proof mass; and a second force rebalance coil located on a second surface of the proof mass, and wherein the processing circuitry is configured to control a first electrical current flowing through the first force rebalance coil and control a second electrical current flowing through the second force rebalance coil to maintain the proof mass in the null position.

Clause 8: The accelerometer system of clause 7, wherein to maintain the null position of the proof mass assembly, the processing circuitry is configured to: control the first electrical current such that a first Lorentz force results from an interaction of the first electrical current with a first magnetic flux across the first force rebalance coil; and control the second electrical current such that a second Lorentz force results from an interaction of the second electrical current with a second magnetic flux across the second force rebalance coil, and wherein the first Lorentz force and the second Lorentz force counteract an acceleration force caused by an acceleration of the accelerometer system.

Clause 9: The accelerometer system of clause 8, wherein a magnitude of the first Lorenz force represents a cross product of a magnitude of the first electrical current and a magnitude of the first magnetic flux, and wherein a magnitude of the second Lorenz force represents a cross product of a magnitude of the second electrical current and a magnitude of the second magnetic flux.

Clause 10: The accelerometer system of any of clauses 1-9, wherein the first housing comprises a first inner portion and a first outer portion, wherein the first cover is removably attached to the first outer portion of the first housing, wherein the second housing comprises a second inner portion and a second outer portion, wherein the second cover is removably attached to the second outer portion of the second housing, and wherein the accelerometer system further comprises: a first pole piece attached to the first inner portion of the first housing; and a second pole piece attached to the second inner portion of the second housing.

Clause 11: The accelerometer system of clause 10, further comprising: a first electromagnetic coil located within the first recess, wherein the first electromagnetic coil is configured to generate a first magnetic flux that travels through a first magnetic circuit, wherein a first Lorentz force results from an interaction between the first magnetic flux and a first electrical current flowing through a first force rebalance coil; and a second electromagnetic coil located within the second recess, wherein the second electromagnetic coil is configured to generate a second magnetic flux that travels through a second magnetic circuit, wherein a second Lorentz force results from an interaction between the second magnetic flux and a second electrical current flowing through a second force rebalance coil.

Clause 12: The accelerometer system of any of clauses 1-11, further comprising: a first one or more fasteners that couple the first housing to the first cover; and a second one or more fasteners that couple the second housing to the second cover.

Clause 13: An accelerometer system comprising: an excitation ring comprising: a housing; and a cover removably attached to the housing, wherein the housing and the cover define a recess. Additionally, the accelerometer system includes a proof mass assembly positioned on one side of the excitation ring; and processing circuitry located within the recess, wherein the excitation ring shields the processing circuitry from harmful levels of radiation existing outside of the accelerometer system, wherein the processing circuitry is configured to maintain a proof mass of the proof mass assembly in a null position.

Clause 14: The accelerometer system of clause 13, wherein the housing and the cover comprise a material configured to prevent the harmful levels of radiation existing outside of the accelerometer system from entering the recess.

Clause 15: The accelerometer system of any of clauses 13-14, wherein the material comprises a metal alloy.

Clause 16: The accelerometer system of any of clauses 13-15, wherein the material comprises invar.

Clause 17: The accelerometer system of any of clauses 13-16, wherein the harmful levels of radiation may comprise at least one of harmful levels of gamma radiation, harmful levels of cosmic rays, or harmful levels of high-energy particles.

Clause 18: The accelerometer system of any of clauses 13-17, wherein the proof mass assembly comprises a force rebalance coil located on a surface of the proof mass, and wherein the processing circuitry is configured to control an electrical current flowing through the force rebalance coil to maintain the proof mass in the null position.

Clause 19: The accelerometer system of clause 18, wherein to maintain the null position of the proof mass assembly, the processing circuitry is configured to control the electrical current such that a Lorentz force results from an interaction of the electrical current with a magnetic flux across the force rebalance coil, wherein the Lorentz force counteracts an acceleration force caused by an acceleration of the accelerometer system.

Clause 20: A method comprising: forming an excitation ring, wherein forming the excitation ring comprises: forming a housing; and forming a cover removably attached to the housing, wherein the housing and the cover define a recess. Additionally, the method includes forming a proof mass assembly positioned on one side of the excitation ring; forming processing circuitry located within the recess, wherein the excitation ring shields the processing circuitry from harmful levels of radiation existing outside of the accelerometer system, wherein the processing circuitry is configured to maintain a proof mass of the proof mass assembly in a null position.

Clause 21: An accelerometer system comprising: a first electromagnetic coil and a first excitation ring comprising: a first housing; and a first cover removably attached to the first housing, wherein the first housing and the first cover define a first recess configured to house the first electromagnetic coil. Additionally, the accelerometer system includes a second electromagnetic coil and a second excitation ring comprising: a second housing; and a second cover removably attached to the second housing, wherein the second housing and the second cover define a second recess configured to house the second electromagnetic coil. Additionally, the accelerometer system includes a proof mass assembly positioned between the first excitation ring and the second excitation ring, wherein the first electromagnetic coil is configured to generate a first magnetic flux that flows through the first excitation ring and maintains a proof mass of the proof mass assembly in a null position, and wherein the second electromagnetic coil is configured to generate a second magnetic flux that flows through the second excitation ring and maintains the proof mass in the null position.

Clause 22: The accelerometer system of clause 21, wherein a material of the first housing and a material of the first cover have substantially the same coefficient of thermal expansion (CTE) such that the first magnetic flux flows through materials having a substantially uniform CTE, and wherein a material of the second housing and a material of the second cover have substantially the same CTE such that the second magnetic flux flows through materials having a substantially uniform CTE.

Clause 23: The accelerometer system of clause 22, wherein each of the material of the first housing, the material of the first cover, the material of the second housing, and the material of the second housing comprises invar.

Clause 24: The accelerometer system of any of clauses 21-23, wherein the first magnetic flux flows through the first excitation ring without flowing through the first electromagnetic coil located within the first recess, and wherein the second magnetic flux flows through the second excitation ring without flowing through the second electromagnetic coil located within the second recess.

Clause 25: The accelerometer system of any of clauses 21-24, wherein a first one or more fasteners attach the first housing to the second cover, and wherein a second one or more fasteners attach the second housing to the second cover.

Clause 26: The accelerometer system of clause 25, wherein the first one or more fasteners attach the first housing to the second cover without adhesive, and wherein the second one or more fasteners attach the second housing to the second cover without adhesive.

Clause 27: The accelerometer system of any of clauses 21-26, wherein the first housing comprises a first inner portion and a first outer portion, wherein the first cover is removably attached to the first outer portion of the first housing, wherein the second housing comprises a second inner portion and a second outer portion, wherein the second cover is removably attached to the second outer portion of the second housing, and wherein the accelerometer system further comprises: a first pole piece attached to the first inner portion of the first housing; and a second pole piece attached to the second inner portion of the second housing, and wherein the proof mass assembly further comprises: a first force rebalance coil attached to a first surface of the proof mass and located within a first coil gap between the first cover and the first pole piece; and a second force rebalance coil attached to a second surface of the proof mass and located within a second coil gap between the second cover and the second pole piece.

Clause 28: The accelerometer system of clause 27, wherein the first magnetic flux: flows from the first pole piece to the first cover across the first force rebalance coil, flows through the first cover to the first housing, and flows through the first housing back to the first pole piece to complete a first magnetic circuit, and wherein the second magnetic flux: flows from the second pole piece to the second cover across the second force rebalance coil, flows through the second cover to the second housing, and flows through the second housing back to the second pole piece to complete a second magnetic circuit.

Clause 29: The accelerometer system of clause 28, wherein the first magnetic flux interacts with a first electrical current flowing through the first force rebalance coil to apply a first Lorentz force to the proof mass, wherein the second magnetic flux interacts with a second electrical current flowing through the second force rebalance coil to apply a second Lorentz force to the proof mass, and wherein the first Lorentz force and the second Lorentz force counteract an acceleration force caused by an acceleration of the accelerometer system.

Clause 30: The accelerometer system of clause 29, wherein a magnitude of the first Lorentz force is a cross product of a magnitude of the first magnetic flux with a magnitude of the first electrical current, and wherein a magnitude of the second Lorentz force is a cross product of a magnitude of the second magnetic flux with a magnitude of the second electrical current.

Clause 31: An accelerometer system comprising: an electromagnetic coil; an excitation ring comprising: a housing; and a cover removably attached to the housing, wherein the housing and the cover define a recess configured to house the electromagnetic coil; and a proof mass assembly positioned on one side of the excitation ring, wherein the electromagnetic coil is configured to generate a magnetic flux that flows through the excitation ring and maintains a proof mass of the proof mass assembly in a null position.

Clause 32: The accelerometer system of clause 31, wherein a material of the housing and a material of the cover have substantially the same coefficient of thermal expansion (CTE) such that the magnetic flux flows through materials having a substantially uniform CTE.

Clause 33: The accelerometer system of clause 32, wherein each of the material of the housing and the material of the cover comprises invar.

Clause 34: The accelerometer system of any of clauses 31-33, wherein the magnetic flux flows through the excitation ring without flowing through the electromagnetic coil located within the recess.

Clause 35: The accelerometer system of any of clauses 31-34, wherein one or more fasteners attach the housing to the cover.

Clause 36: The accelerometer system of clause 35, wherein the one or more fasteners attach the housing to the cover without adhesive.

Clause 37: The accelerometer system of any of clauses 31-36, wherein the housing comprises an inner portion and an outer portion, wherein the cover is removably attached to the outer portion of the housing, wherein the accelerometer system further comprises a pole piece attached to the inner portion of the housing, and wherein the proof mass assembly further comprises a force rebalance coil attached to a surface of the proof mass and located within a coil gap between the cover and the pole piece.

Clause 38: The accelerometer system of clause 37, wherein the magnetic flux flows from the pole piece to the cover across the force rebalance coil, flows through the cover to the housing, and flows through the housing back to the pole piece to complete a magnetic circuit.

Clause 39: The accelerometer system of clause 38, wherein the magnetic flux interacts with an electrical current flowing through the force rebalance coil to apply a Lorentz force to the proof mass, wherein the Lorentz force counteracts an acceleration force caused by an acceleration of the accelerometer system.

Clause 40: A method comprising: forming an electromagnetic coil; and forming an excitation ring, wherein forming the excitation ring comprises: forming a housing; and forming a cover removably attached to the housing, wherein the housing and the cover define a recess configured to house the electromagnetic coil; forming a proof mass assembly positioned on one side of the excitation ring, wherein the electromagnetic coil is configured to generate a magnetic flux that flows through the excitation ring and maintains a proof mass of the proof mass assembly in a null position.

In one or more examples, the accelerometers described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

What is claimed is:
1. An accelerometer system comprising:
    a first excitation ring comprising:
        a first housing comprising a first inner portion and a first outer portion, wherein the first inner portion and the first outer portion comprise a single piece of material;

a first cover removably attached to the first outer portion of the first housing, wherein the first inner portion, the first outer portion, and the first cover define a first recess; and a first pole piece directly and removably attached to the first inner portion of the first housing;

a second excitation ring comprising:

a second housing comprising a second inner portion and a second outer portion, wherein the second inner portion and the second outer portion comprise a single piece of material;

a second cover removably attached to the second outer portion of the second housing, wherein the second inner portion, the second outer portion, and the second cover define a second recess; and a second pole piece directly and removably attached to the second inner portion of the second housing;

a proof mass assembly positioned between the first excitation ring and the second excitation ring;

a first electromagnetic coil located within the first recess, wherein the first electromagnetic coil is configured to generate a first magnetic flux that travels through the first excitation ring;

a second electromagnetic coil located within the second recess, wherein the second electromagnetic coil is configured to generate a second magnetic flux that travels through the second excitation ring; and processing circuitry located within one or both of the first recess and the second recess, wherein the first excitation ring and the second excitation ring shield the processing circuitry from harmful levels of radiation existing outside of the accelerometer system, and wherein the processing circuitry is configured to cause a first Lorentz force corresponding to the first magnetic flux and a second Lorentz force corresponding to the second magnetic flux to maintain a proof mass of the proof mass assembly in a null position.

2. The accelerometer system of claim 1, wherein the first housing, first cover, second housing, and second cover comprise a material configured to prevent the harmful levels of radiation existing outside of the accelerometer system from entering the first recess and the second recess.

3. The accelerometer system of claim 1, wherein the material comprises a metal alloy.

4. The accelerometer system of claim 1, wherein the material comprises invar.

5. The accelerometer system of claim 1, wherein the harmful levels of radiation may comprise at least one of harmful levels of gamma radiation, harmful levels of cosmic rays, or harmful levels of high-energy particles.

6. The accelerometer system of claim 1, further comprising a band that connects the first excitation ring and the second excitation ring and extends around an outer circumference of the accelerometer system such that the band covers a gap between the first excitation ring and the second excitation ring, the band further protecting the processing circuitry located within one or both of the first recess and the second recess from the harmful levels of radiation outside of the accelerometer system.

7. The accelerometer system of claim 1, wherein the proof mass assembly comprises:

a first force rebalance coil located on a first surface of the proof mass; and a second force rebalance coil located on a second surface of the proof mass, and wherein the processing circuitry is configured to control a first electrical current flowing through the first force rebalance coil and control a second electrical current flowing through the second force rebalance coil to maintain the proof mass in the null position.

8. The accelerometer system of claim 7, wherein to maintain the null position of the proof mass assembly, the processing circuitry is configured to:

control the first electrical current such that the first Lorentz force results from an interaction of the first electrical current with the first magnetic flux across the first force rebalance coil; and control the second electrical current such that the second Lorentz force results from an interaction of the second electrical current with the second magnetic flux across the second force rebalance coil, and wherein the first Lorentz force and the second Lorentz force counteract an acceleration force caused by an acceleration of the accelerometer system.

9. The accelerometer system of claim 8, wherein a magnitude of the first Lorentz force represents a cross product of a magnitude of the first electrical current and a magnitude of the first magnetic flux, and wherein a magnitude of the second Lorentz force represents a cross product of a magnitude of the second electrical current and a magnitude of the second magnetic flux.

10. The accelerometer system of claim 1, wherein the first Lorentz force results from an interaction between the first magnetic flux and a first electrical current flowing through a first force rebalance coil, and wherein the second Lorentz force results from an interaction between the second magnetic flux and a second electrical current flowing through a second force rebalance coil.

11. The accelerometer system of claim 1, further comprising:

a first one or more fasteners that couple the first housing to the first cover; and a second one or more fasteners that couple the second housing to the second cover.

12. An accelerometer system comprising:

an excitation ring comprising:

a housing comprising an inner portion and an outer portion, wherein the inner portion and the outer portion comprise a single piece of material;

a cover removably attached to the outer portion of the housing, wherein the inner portion, the outer portion, and the cover define a recess; and a pole piece directly and removably attached to the inner portion of the housing;

a proof mass assembly positioned on one side of the excitation ring;

an electromagnetic coil located within the recess, wherein the electromagnetic coil is configured to generate a magnetic flux that travels through the excitation ring; and processing circuitry located within the recess, wherein the excitation ring shields the processing circuitry from harmful levels of radiation existing outside of the accelerometer system, wherein the processing circuitry is configured to cause a Lorentz force corresponding to the magnetic flux to maintain a proof mass of the proof mass assembly in a null position.

13. The accelerometer system of claim 12, wherein the housing and the cover comprise a material configured to prevent the harmful levels of radiation existing outside of the accelerometer system from entering the recess.

14. The accelerometer system of claim 12, wherein the material comprises a metal alloy.

15. The accelerometer system of claim 12, wherein the material comprises invar.

16. The accelerometer system of claim 12, wherein the harmful levels of radiation may comprise at least one of harmful levels of gamma radiation, harmful levels of cosmic rays, or harmful levels of high-energy particles.

17. The accelerometer system of claim 12,
wherein the proof mass assembly comprises a force rebalance coil located on a surface of the proof mass, and
wherein the processing circuitry is configured to control an electrical current flowing through the force rebalance coil to maintain the proof mass in the null position.

18. The accelerometer system of claim 17,
wherein to maintain the null position of the proof mass assembly, the processing circuitry is configured to control the electrical current such that the Lorentz force results from an interaction of the electrical current with the magnetic flux across the force rebalance coil,
wherein the Lorentz force counteracts an acceleration force caused by an acceleration of the accelerometer system.

19. A method comprising:
forming an excitation ring, wherein forming the excitation ring comprises:
  forming a housing comprising an inner portion and an outer portion, wherein the inner portion and the outer portion comprise a single piece of material;
  forming a cover removably attached to the outer portion of the housing, wherein the inner portion, the outer portion, and the cover define a recess; and
  forming a pole piece directly and removably attached to the inner portion of the housing;
forming a proof mass assembly positioned on one side of the excitation ring;
forming an electromagnetic coil located within the recess, wherein the electromagnetic coil is configured to generate a magnetic flux that travels through the excitation ring; and
forming processing circuitry located within the recess, wherein the excitation ring shields the processing circuitry from harmful levels of radiation existing outside of the excitation ring, wherein the processing circuitry is configured to cause a Lorentz force corresponding to the magnetic flux to maintain a proof mass of the proof mass assembly in a null position.

20. The accelerometer system of claim 12, wherein the accelerometer system does not include a permanent magnet between the pole piece and the inner portion of the housing.

* * * * *